(12) United States Patent  
Schröder et al.

(10) Patent No.: US 11,768,419 B1  
(45) Date of Patent: Sep. 26, 2023

(54) BEAM STEERING SYSTEM

(71) Applicants: Volkswagen Aktiengesellschaft, Wolfsburg (DE); LensVector, San Jose, CA (US)

(72) Inventors: Heiko Schröder, Meinersen (DE); Tigran Galstian, San Jose, CA (US); Armen Zohrabyan, San Jose, CA (US)

(73) Assignees: VOLKSWAGEN AKTIENGESELLSCHAFT, Wolfsburg (DE); LENSVECTOR, San Jose, CA (US)

( * ) Notice: Subject to any disclaimer, the term of this patent is extended or adjusted under 35 U.S.C. 154(b) by 0 days.

(21) Appl. No.: 17/858,285

(22) Filed: Jul. 6, 2022

(51) Int. Cl.
*G02F 1/29* (2006.01)

(52) U.S. Cl.
CPC ...................... *G02F 1/29* (2013.01)

(58) Field of Classification Search
None
See application file for complete search history.

(56) References Cited

U.S. PATENT DOCUMENTS

| | | | |
|---|---|---|---|
| 6,975,786 B1* | 12/2005 | Warr | G02B 5/32 359/559 |
| 8,248,700 B1* | 8/2012 | Zorabedian | G02B 27/46 359/618 |
| 2010/0271684 A1* | 10/2010 | Woodgate | G02B 27/0905 359/256 |
| 2011/0234951 A1* | 9/2011 | Cohen | G02B 6/29311 349/113 |
| 2016/0170287 A1* | 6/2016 | Bitauld | G02F 1/2955 385/4 |
| 2017/0269453 A1* | 9/2017 | Galstian | G02F 1/29 |
| 2018/0299744 A1* | 10/2018 | Suh | G02B 6/356 |
| 2020/0400885 A1* | 12/2020 | Nakajima | G02B 6/2821 |
| 2023/0065504 A1* | 3/2023 | Wagner | C12M 23/42 |

FOREIGN PATENT DOCUMENTS

JP          2000171617 A    6/2000    ........... G02B 3/00

OTHER PUBLICATIONS

Chen, Mingce et al., "Electrically Controlled Liquid Crystal Microlens Array Based on Single-Crystal Graphene Coupling Alignment for Plenoptic Imaging," Micromachines, vol. 11, 10 pages, Nov. 26, 2020.

* cited by examiner

*Primary Examiner* — Ryan Crockett
(74) *Attorney, Agent, or Firm* — Slayden Grubert Beard PLLC

(57) ABSTRACT

A beam steering system may include a dynamically controllable liquid crystal (LC) beam steering device including an array of multiple LC beam steering segments, an upstream lens array arranged upstream of the beam steering device, and control electronics configured to control the beam steering device to output a directionally steered light. The upstream lens array includes multiple upstream lens elements, each configured to reduce a beam width of a respective light beam to provide a reduced-diameter light beam to a corresponding LC beam steering segment in the multi-segment LC beam steering device. Providing reduced-diameter light beams to the beam steering device may reduce unwanted beam steering effects and provide an improved beam steering efficiency of the beam steering system.

20 Claims, 18 Drawing Sheets

US 11,768,419 B1

BEAM STEERING SYSTEM

TECHNICAL FIELD

The present disclosure relates to beam steering systems, and more particularly to a beam steering system with an upstream lens or upstream lens array to reduce unwanted beam steering effects.

BACKGROUND

This background section is provided for the purpose of generally describing the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Dynamic steering of light has many industrial applications, for example automotive headlights, architectural illumination, and LiFi communications. Conventional light steering systems employed mechanical tools, for example dynamically rotating mirrors. However, mechanical movement is undesirable in certain applications, for example in automobiles. Non-mechanical light steering systems have also been developed, for example electronic steering devices based on thin liquid crystal on silicon (LCOS) technology. Some device steer light by light diffraction, typical in reflection geometry. However, such devices are often limited by low diffraction efficiency, polarization dependence, and high cost.

Recently, significant efforts have been made to develop relatively thick liquid crystal (LC) layers, based on a refractive steering mechanism, in particular a refractive-type tunable prism effect. FIG. 1A shows a side cross-sectional representation of an example LC beam steering device 100 including a single LC device 102 including liquid crystal molecules 104 arranged between a pair of substrates 106a and 106b, and a set of electrodes 110 provided on substrates 106a and 106b. For example, the electrodes 110 include a pair of linear electrodes E1 and E2 on the input-side substrate 106a, and a third planar electrode E3 on the output-side substrate 106b. A clear aperture (CA) is defined between the pair of linear electrodes E1 and E2.

The electrodes 110 can be selectively activated to control a shape of an electrical potential in the space between substrates 106a and 106b, which orients the liquid crystal molecules 104 and thereby influences light passing through the CA of LC device 102. The LC beam steering device 100 also includes a uniform thin weakly conductive (or semi-conductive) layer (WCL) 114 provided (FIG. 1B) on the input-side substrate 106a, which biases the electrical potential generated by electrodes 110 in an asymmetric manner, to directionally steer the light passing through the CA, thereby producing an output beam at a tilting angle a relative to the input beam. The WCL 114 may be formed from a conductive polymer (e.g., PEDOT), non stochiometric metal oxides (e.g., TixOy), spatially patterned ITO, or other suitable materials.

FIG. 1B shows an example representation of an electrical potential U generated by activating electrode E1 (e.g., by applying a high potential to electrode E1 relative to electrode E3, while electrode E2 is "floating"). As schematically demonstrated in FIG. 1B, the electric potential U decreases gradually in space in all directions away from electrode E1. The scale of this decrease, defining the "fringing field" of the activated electrode E1, is a function of the distance L (in the y-axis direction) between electrode E1 and electrode E3. As shown, the WCL 114 asymmetrically influences the electric potential U, in this case in the positive y-axis direction, which directionally steers the light passing through the CA of LC device 102.

However, due to the fringing fields mentioned above, the spatial distribution of the electric potential U generated by electrodes 110 has a complex shape. This complex shape causes undesirable deformation of the electric potential U in certain areas, or zones. For example, the illustrated electric potential U includes a misdirection zone ZM in which the gradient of the potential U ("potential gradient") is directed in a reverse direction (in the negative y-direction) relative to an intended direction zone ZD in which the potential gradient is directed in the intended direction (in the positive y-direction). In addition, even within the intended direction zone ZD, the potential gradient is largely non-linear in a zone ZN (non-linear zone) near electrode E1, resulting in unwanted deformation of the steered light in the zone ZN. Thus, only in a relatively small central zone ZL is the potential gradient directed in the correct direction (the positive y-direction) and sufficiently linear to avoid significant deformation of the steered light.

FIG. 1C illustrates the effects of the electric potential U generated by the LC beam steering device 100 discussed above. As shown, an input beam with a circular profile is received at the LC beam steering device 100 in an activated state. The LC beam steering device 100 outputs (a) a major beam steered in the intended direction, but deformed (elongated) as a result of the non-linear zone ZN, and (b) a satellite beam steered in the opposite direction as the major beam, resulting from the misdirection zone ZM.

For the LC beam steering device 100 discussed above, the steering angle (or "tilting angle") α of the output beam is inversely proportional to the CA of the device, and thus typically small. To produce a larger steering angle α, an LC beam steering device may be constructed with an array of multiple LC beam steering segments with smaller CAs.

FIGS. 2A and 2B show an example multi-segment LC beam steering device 200 including an array of LC beam steering segments 202, each LC beam steering segment 202 including an array of liquid crystal molecules 204 arranged between a respective pair of substrates 206a and 206b, with electrodes 210 provided on substrate 206a and/or 206b. Each LC beam steering segment 202 produces a respective output beam at a steering angle a, which may be greater than the corresponding steering angle a of the LC beam steering device 100 of FIG. 1A.

As shown in FIGS. 2A and 2B, the example multi-segment LC beam steering device 200 including a layer of liquid crystal molecules 204 arranged between a pair of substrates 206a and 206b providing an example electrode arrangement 210 that defines four LC beam steering segments 202a-202d. The electrode arrangement 210 includes four electrode pairs on the input-side substrate 206a, each electrode pair including a first electrode E1 and a second electrode E2, and a uniform third electrode E3 on the output-side substrate 206b.

Each LC beam steering segment 202a-202d includes a respective pair of electrodes E1 and E2 opposing the third electrode E3, and defines a respective clear aperture (CA) between respective the pair of electrodes E1 and E2. Each electrode E1 and E2 has a width "w." Electrodes E1-E3 can be selectively activated to control a shape of an electrical potential between substrates 206a and 206b, which orients the liquid crystal molecules 204 and thereby influences light passing through the CA of each respective LC beam steering segment 202a-202d.

In addition, the example multi-segment LC beam steering device 200 includes a WCL 214 on the input-side substrate 206a to extend a propagation of the electrical potential generated by electrodes E1-E3. The WCL 214 may be discontinuous, in particular interrupted by a gap between adjacent LC beam steering segments 202a-202d, indicated as gap "g" in FIG. 2A. Thus, each LC beam steering segment 202a-202d includes a respective WCL region 214a-214d. The discontinuous WCL 214 provides an asymmetric extension of the electric potential, to directionally steer the light passing through the CA of each respective LC beam steering segment 202a-202d.

FIG. 2C shows an example representation of an electrical potential U generated by activating electrodes E1 of the example multi-segment LC beam steering device 200. As shown, the WCL regions 214a-214d asymmetrically influence the electric potential U, in this case in the positive y-axis direction, which directionally steers light entering the CA of each respective LC beam steering segment 202a-202d.

As shown, the spatial distribution of the electric potential U has a complex shape, e.g., due to geometric limitations of the multi-segment LC beam steering device 200 and fringing fields of electrical potential U, causing undesirable deformation of the electric potential U in certain zones. For example, for each respective LC beam steering segment 202a-202d, the electric potential U generated by the respective electrode E1 includes a misdirection zone ZM and a largely non-linear in a zone ZN (non-linear zone) within the intended direction zone ZD. Thus, only in a relatively small central zone ZL is the potential gradient directed in the correct direction (to the right in FIG. 2B) and sufficiently linear to avoid significant deformation of the steered light.

FIG. 2D, similar to FIG. 1C discussed above, illustrates the effects of the electric potential U generated by the multi-segment LC beam steering device 200. As shown, an input beam with a circular profile is received at the multi-segment LC beam steering device 200 in an activated state. The LC beam steering device 200 outputs (a) a major beam steered in the intended direction, but deformed (elongated) as a result of the non-linear zone ZN, and (b) a satellite beam steered in the opposite direction as the major beam, resulting from the misdirection zone ZM.

Attempts have been made to reduce minimize the undesired zones discussed above (e.g., non-linear zone ZN and misdirection zone ZM), including physically blocking (e.g., by absorbing or reflecting) light in the undesired zones. However, such designs reduce the overall efficiency of light transmission and steering efficiency (defined as the ratio of steered energy/incident energy).

Based on the above, an object exists to provide LC beam steering devices with high transmission efficiency and high steering efficiency.

SUMMARY

The object is solved by the subject matter of the independent claims. The dependent claims and the following description describe various embodiments of the invention.

In general and in one example aspect, a beam steering system includes a liquid crystal (LC) beam steering device, an upstream lens arranged upstream of the LC beam steering device, and control electronics. The LC beam steering device includes LC molecules arranged between a pair of substrates, and at least one electrode. The upstream lens reduces a beam width of a light beam to provide a reduced-diameter light beam incident at the LC beam steering device. The control electronics are configured to dynamically control the at least one electrode of the LC beam steering device to influence the LC molecules to affect a directional steering of the reduced-diameter beam and thereby output a directionally steered beam.

In another example aspect, a beam steering system includes a dynamically controllable multi-segment beam steering device including an array of multiple LC beam steering segments, an upstream lens array including multiple upstream lens elements arranged upstream of the beam steering device, and control electronics. Each upstream lens element reduces a beam width of a respective light beam to provide a respective reduced-diameter light beam incident at a corresponding LC beam steering segment in the multi-segment beam steering device. The control electronics are configured to control each respective LC beam steering segment to directionally steer the respective reduced-diameter beam incident at the respective LC beam steering segment to output a respective directionally steered beam.

The details of one or more embodiments are set forth in the accompanying drawings and the description below. Other features will be apparent from the description, drawings, and from the claims.

BRIEF DESCRIPTION OF THE DRAWINGS

Example aspects of the present disclosure are described below in conjunction with the figures, in which.

Figure 1A:
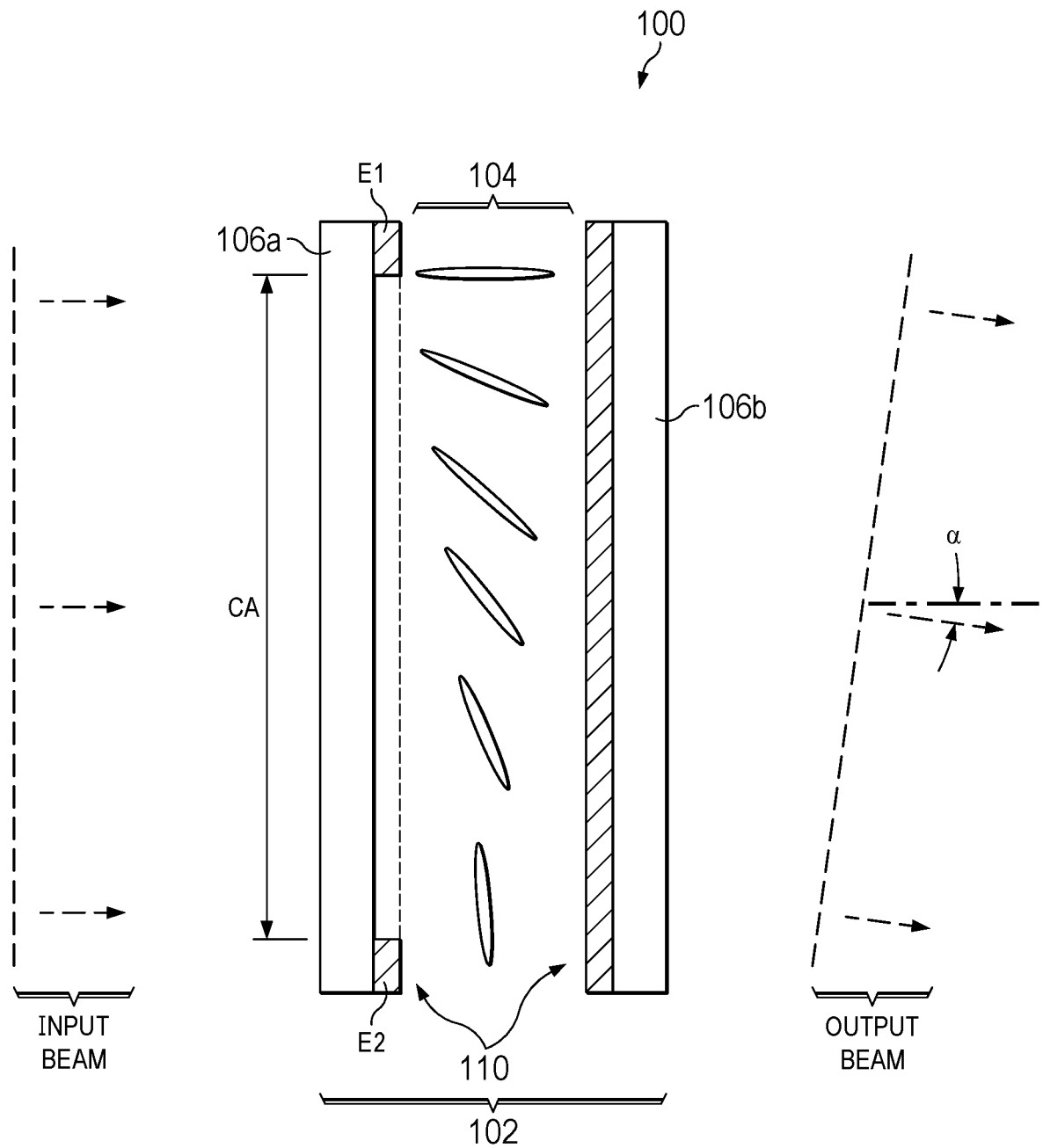
FIG. 1A shows a side cross-sectional view of an example LC beam steering device.
Figure 1B:
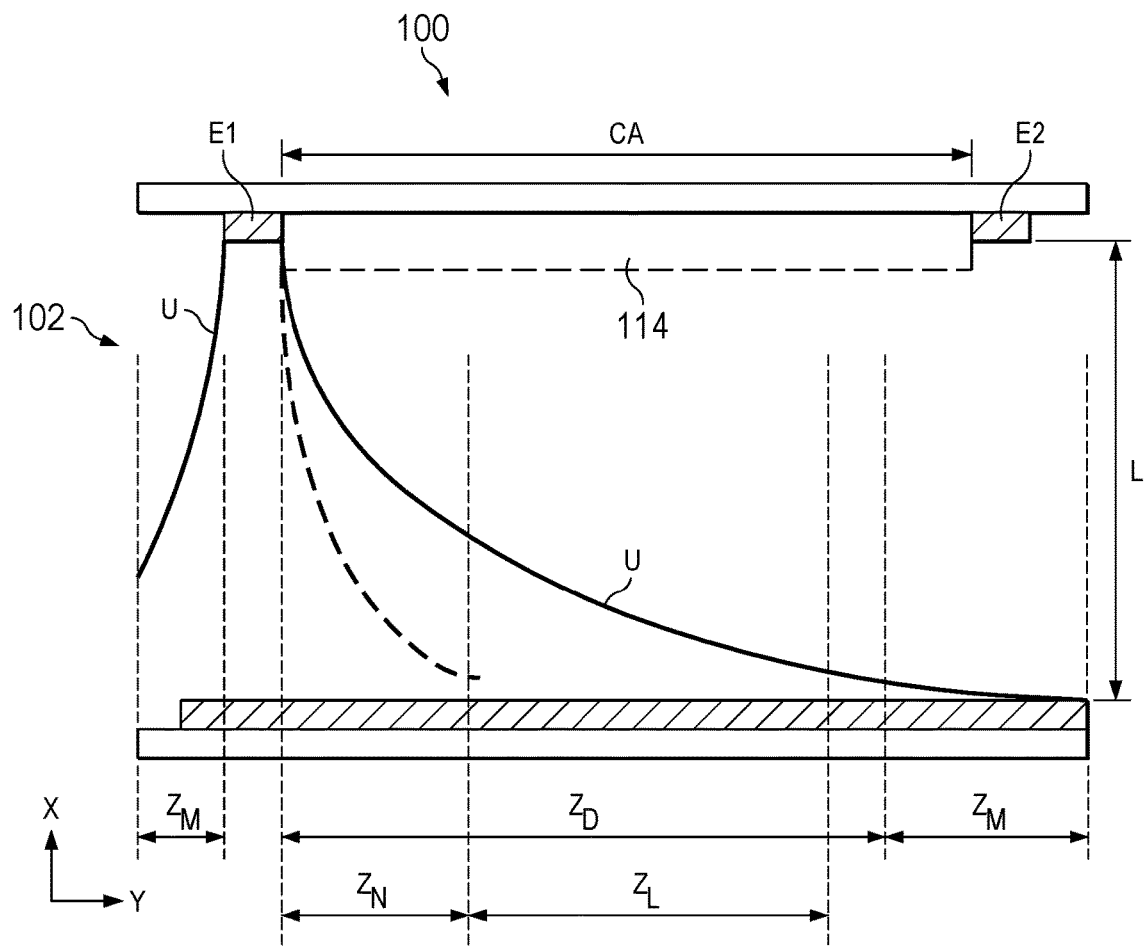
FIG. 1B shows an example representation of an electrical potential U generated by the example LC beam steering device shown in FIG. 1A.
Figure 1C:
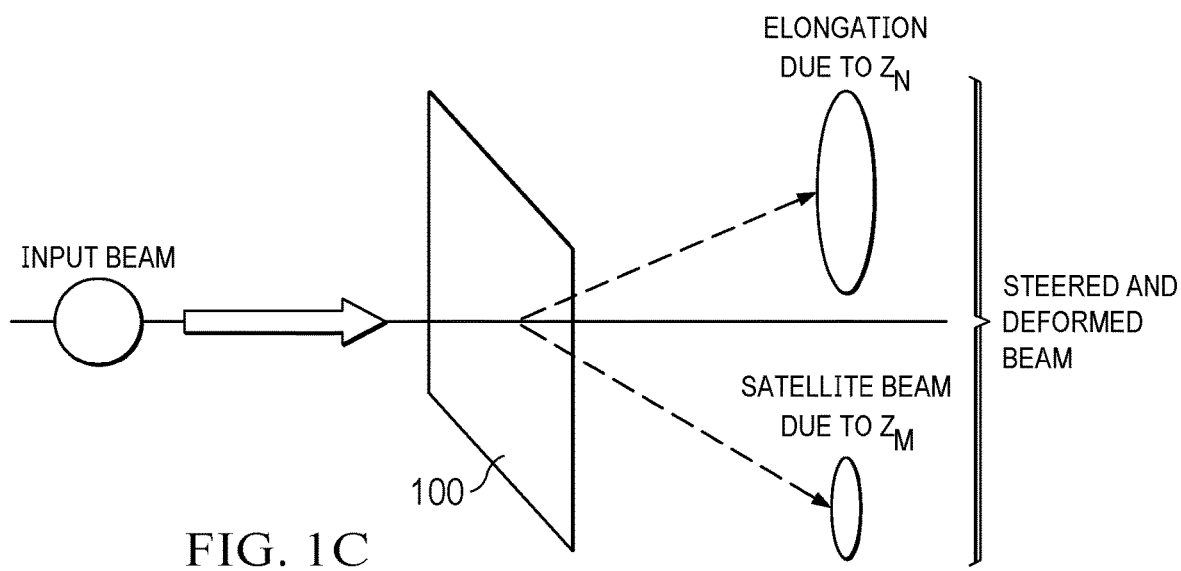
FIG. 1C illustrates undesired effects of the example LC beam steering device of FIGS. 1A-1B, including elongation of a main steered beam and a misdirected satellite beam.
Figure 2A:
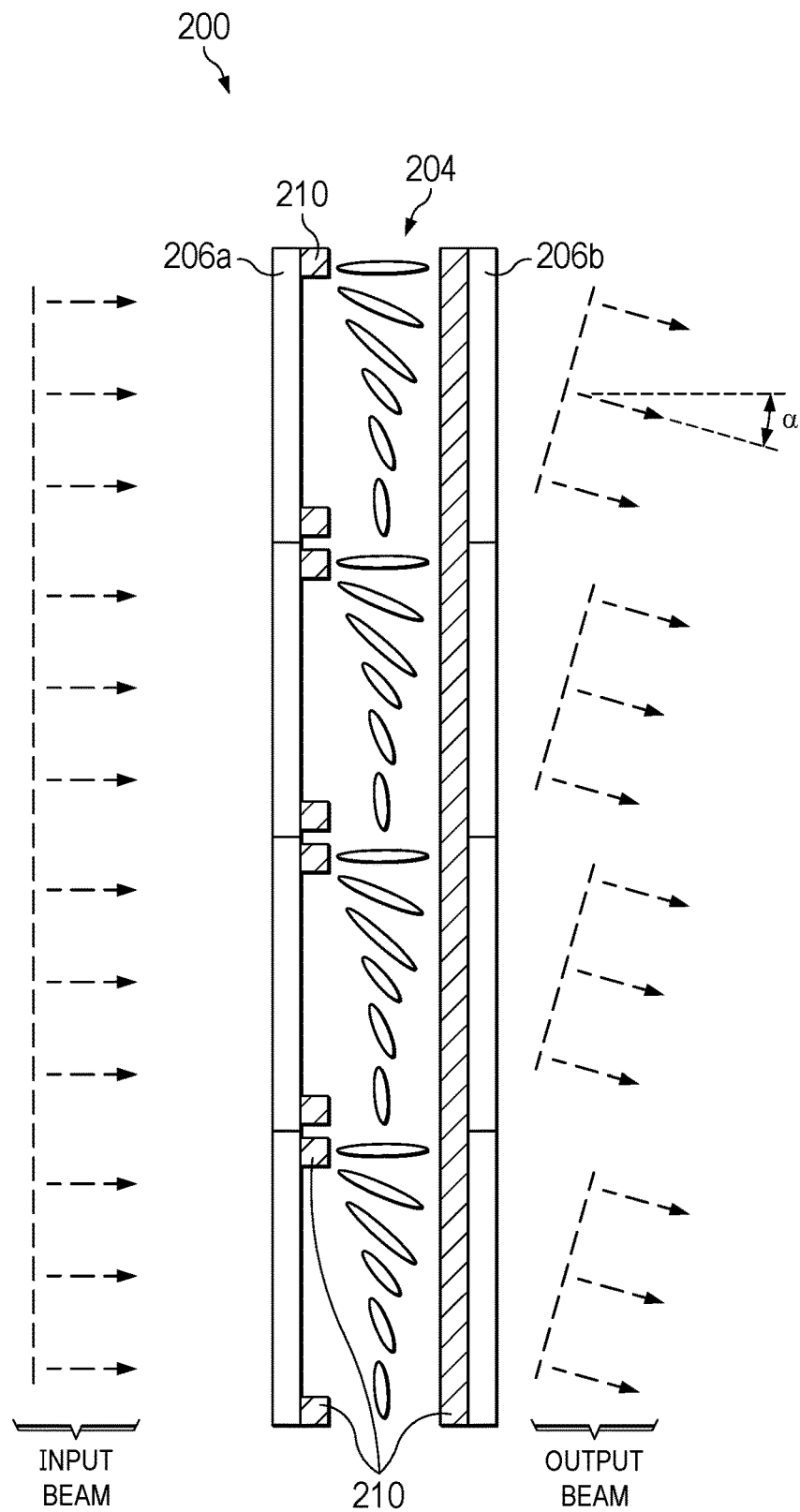
FIGS. 2A and 2B show side cross-sectional views of an example multi-segment LC beam steering device including an array of multiple LC beam steering segments.
Figure 2B:
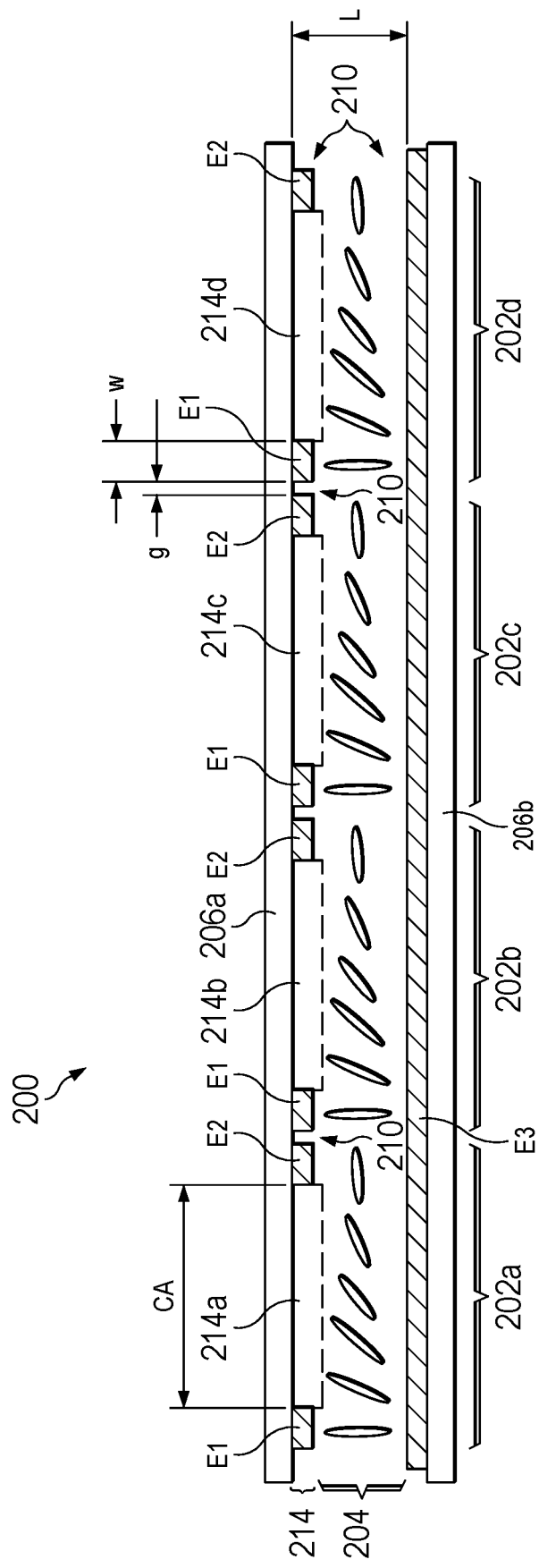
Figure 2C:
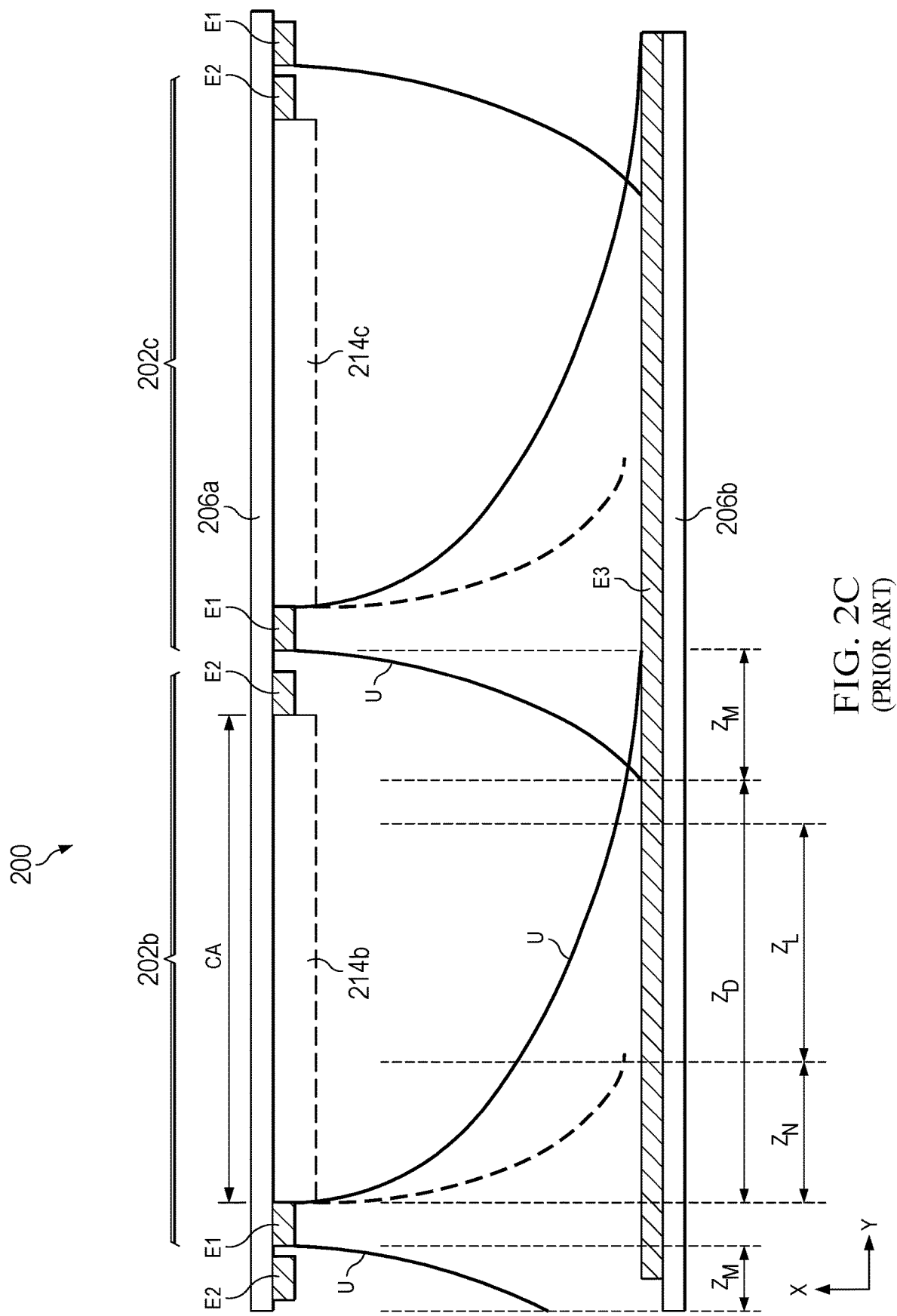
FIG. 2C shows an example representation of an electrical potential U generated by the example multi-segment LC beam steering device shown in FIGS. 2A-2B.
Figure 2D:
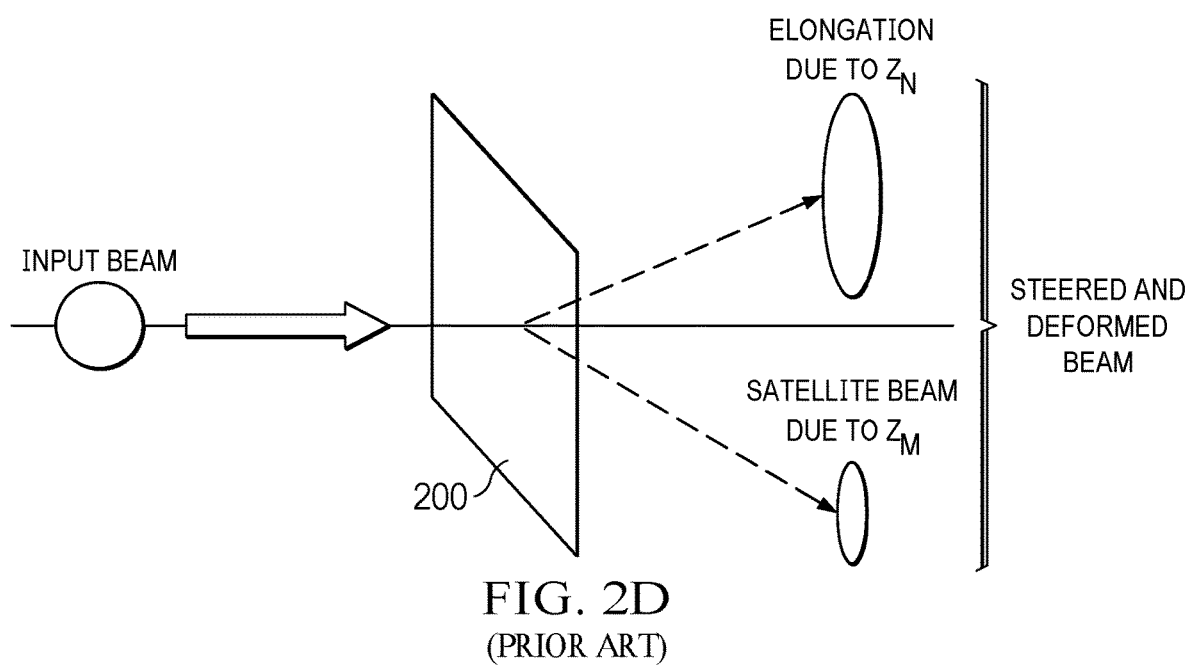
FIG. 2D illustrates undesired effects of the example multi-segment LC beam steering device of FIGS. 2A-2C, including elongation of a main steered beam and a misdirected satellite beam.

It should be understood the reference number for any illustrated element that appears in multiple different figures has the same meaning across the multiple figures, and the mention or discussion herein of any illustrated element in the context of any particular figure also applies to each other figure, if any, in which that same illustrated element is shown.

DETAILED DESCRIPTION

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In view of the shortcomings associated with existing liquid crystal (LC) beam steering systems, the present invention provides improved LC steering systems, for example providing improved transmission efficiency and beam steering efficiency. The transmission efficiency of a system may be defined as a percentage of light input to the system that is propagated through the system, e.g., as opposed to being absorbed or reflected. The beam steering efficiency of a system may be defined as a percentage of light input to the system that is steered (redirected) in a desired direction.

As the present inventors have ascertained, unwanted beam steering effects of an LC beam steering device, e.g., causing unwanted elongation or other deformation of a steered beam and/or satellite beams misaligned from the steered beam, can be significantly reduced by "pre-conditioning" a light beam prior to reaching an LC beam steering device. Such pre-conditioning of a light beam can be performed by optics arranged upstream LC beam steering device. For example, a lens arranged upstream of a LC beam steering device, referred to herein as an "upstream lens," may reduce a beam width of a light beam to provide a reduced-diameter light beam to an LC beam steering device, which may reduce unwanted beam steering effects of the LC beam steering device.

According to a first example aspect, a beam steering system includes an LC beam steering device, an upstream lens arranged upstream of the LC beam steering device, and control electronics. The LC beam steering device includes LC molecules arranged between a pair of substrates, and at least one electrode. The upstream lens reduces a beam width of a light beam to provide a reduced-diameter light beam incident at the LC beam steering device. The control electronics of the beam steering system may be configured to dynamically control the electrode(s) of the LC beam steering device to influence the LC molecules to affect a directional steering of the reduced-diameter beam and thereby output a directionally steered beam.

A "light beam" (or simply "beam" for convenience) refers to any directional projection of light energy radiating from a light source. The "beam width" of a light beam refers to the angular width of the beam in one or more directions (i.e., along one or more axes), which characterizes the rate of divergence or convergence of the beam in one or more specified directions. Reducing the beam width of a light beam (using an upstream lens) may include reducing the divergence or increasing the convergence of the beam in one or more directions. Thus, an upstream lens reducing the beam width of a light beam in a respective direction (i.e., along a respective axis) may include, for example, (a) reducing the divergence of a divergent beam in the respective direction, (b) converting a divergent beam to a collimated beam in the respective direction, (c) converting a divergent beam to a convergent beam in the respective direction, (d) converting a collimated beam to a convergent beam in the respective direction, or (e) increasing the convergence of a convergent beam in the respective direction.

By reducing the beam width of a light beam in one or more directions, the upstream lens may provide a reduced-diameter light beam (in the one or more directions) to an LC beam steering device. The term "reduced-diameter" refers to a beam diameter of a light beam (in one or more directions) at a defined location downstream of the upstream lens relative to a beam diameter (in the one or more directions) of the same light beam at the defined location but in the absence of the upstream lens. The "beam diameter" of a beam, also referred to as the "$1/e^2$ width," is defined by the distance between two opposed points along a line perpendicular to a respective beam axis where the intensity falls to $1/e^2$ (0.135) times a peak intensity of the beam.

Thus, the upstream lens "providing a reduced-diameter light beam to the LC beam steering device" means the beam diameter (in one or more directions) of a light beam incident at the LC beam steering device is smaller than the beam diameter (in the one or more directions) of the same light beam incident at the LC beam steering device in the absence of the upstream lens (i.e., if the upstream lens were removed from the respective system). It should be understood that the upstream lens may provide a reduced-diameter light beam to an LC beam steering device either directly (i.e., with no optics or other beam-influencing elements between the upstream lens and LC beam steering device) or indirectly (i.e., with additional optics or other beam-influencing elements between the upstream lens and LC beam steering device).

In some embodiments, a beam diameter of the reduced-diameter beam incident at the LC beam steering device is smaller than a clear aperture of the LC beam steering device. The clear aperture or "CA" refers to an unobscured portion of LC beam steering device having a limited area through which light can pass. Light entering an LC beam steering device near an edge of the clear aperture may be more prone to unwanted beam steering effects (causing unwanted elongation or other deformation of a steered beam and/or satellite beams misaligned from the steered beam) than light entering the LC beam steering device near the center of the clear aperture. Thus, by providing a beam diameter smaller than the clear aperture of the LC beam steering device, unwanted beam steering effects may be reduced.

In some embodiments, the control electronics are configured to dynamically control the at least one electrode of the LC beam steering device to control a steering angle of the directionally steered beam output by the LC beam steering device. For example, the control electronics may selectively activate one or more electrodes and/or control the voltage applied to each respective electrode to dynamically steer an output beam. For instance, where an LC beam steering device is used for steering a vehicle headlight, control electronics may selectively dynamically steer an output beam as a function of a current steering (e.g., turning) of the vehicle, or to adjust for a rotational incline of the vehicle (e.g., caused by a weight imbalance in the vehicle).

In some embodiments, the LC beam steering device is arranged upstream of focal plane of the upstream lens. The inventors have ascertained this may increase the beam steering efficiency of the respective system, in at least some embodiments.

In some embodiments, the beam steering system also includes a downstream lens arranged downstream of the upstream lens. The downstream lens may be arranged downstream or upstream of the LC beam steering device, depending on the particular embodiment.

In some embodiments, the downstream lens is arranged downstream of the LC beam steering device, and is configured to reduce a beam width of the directionally steered beam output by the LC beam steering device. Reducing the beam width of the directionally steered beam may include reducing the divergence or increasing the convergence of the beam, e.g., depending on the characteristics of the directionally steered beam output by the LC beam steering device. Thus, the downstream lens may help direct the directionally steered beam toward the desired direction, e.g., with less divergence.

In some embodiments, a focal distance of the upstream lens is greater than a focal distance of the downstream lens. The inventors have ascertained this may increase the beam steering efficiency in some embodiments.

In other embodiments, a multi-segment beam steering device is used, for example to produce an increased steering angle α. In such embodiments, an upstream lens array including multiple upstream lenses (or "lenslets") may be provided to pre-condition light before reaching the multi-segment beam steering device, with each upstream lens in the upstream lens array pre-conditioning a respective light beam before reaching a corresponding LC beam steering segment in the multi-segment beam steering device. For example, each respective upstream lens in the upstream lens array may reduce the beam width of a respective light beam to provide a respective reduced-diameter light beam to a corresponding LC beam steering device in the multi-segment beam steering device, which may reduce unwanted beam steering effects of the multi-segment beam steering device.

Thus, in another example aspect, a beam steering system includes a dynamically controllable multi-segment beam steering device including an array of multiple LC beam steering segments, an upstream lens array including multiple upstream lens elements arranged upstream of the beam steering device, and control electronics. Each upstream lens element reduces a beam width of a respective light beam to provide a respective reduced-diameter light beam incident at a corresponding LC beam steering segment in the multi-segment beam steering device. The control electronics are configured to control each respective LC beam steering segment to directionally steer the respective reduced-diameter beam incident at the respective LC beam steering segment to output a respective directionally steered beam.

In some embodiments, each LC beam steering segment in the multi-segment beam steering device includes a respective clear aperture (CA), and a beam diameter of the respective reduced-diameter beam incident at each respective LC beam steering segment is smaller than the respective clear aperture of the respective LC beam steering segment. As explained above, light entering an LC beam steering segment near an edge of the clear aperture may be more prone to unwanted beam steering effects than light entering the segment near the center of the clear aperture. Thus, by providing each LC beam steering segment an incident beam with a beam diameter smaller than the respective clear aperture, unwanted beam steering effects from each LC beam steering segment may be reduced.

In some embodiments, each respective LC beam steering segment includes LC molecules arranged between a pair of substrates, and at least one electrode controllable by the control electronics to generate an asymmetric reorientation of the LC molecules that influences a steering angle of the directionally steered beam output by the respective LC beam steering segment.

In some embodiments, the upstream lens array has a focal plane, and the multi-segment beam steering device is arranged upstream of focal plane of the upstream lens array. The inventors have ascertained this increases the beam steering efficiency of the multi-segment beam steering device, i.e., a percentage of the reduced-diameter beam incident at each LC beam steering segment that is steered in the desired direction, in some embodiments.

In some embodiments, the beam steering system also includes a downstream lens array including multiple downstream lens elements arranged downstream of the upstream lens array, where each respective downstream lens element corresponds with a respective LC beam steering segment in the multi-segment beam steering device. The downstream lens array may be arranged upstream or downstream of the multi-segment beam steering device, depending on the particular embodiment.

In some embodiments, a focal distance of the upstream lens array is greater than a focal distance of the downstream lens array. The inventors have ascertained this increases the beam steering efficiency in some embodiments.

In some embodiments, the multiple upstream lens elements of the upstream lens array comprise spherical lenses.

In some embodiments, the multi-segment beam steering device includes a two-dimensional array of LC beam steering segments; and the upstream lens array comprises a two-dimensional array of upstream lens elements.

In addition, beam systems disclosed herein that utilize an upstream lens or upstream lens array to pre-condition light upstream of a beam steering device may provide improve transmission efficiency as compared with conventional beam steering systems that physically block (e.g., by absorbing or reflecting) portions of input light associated with the undesired zones of the relevant beam steering device.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

Figure 3:
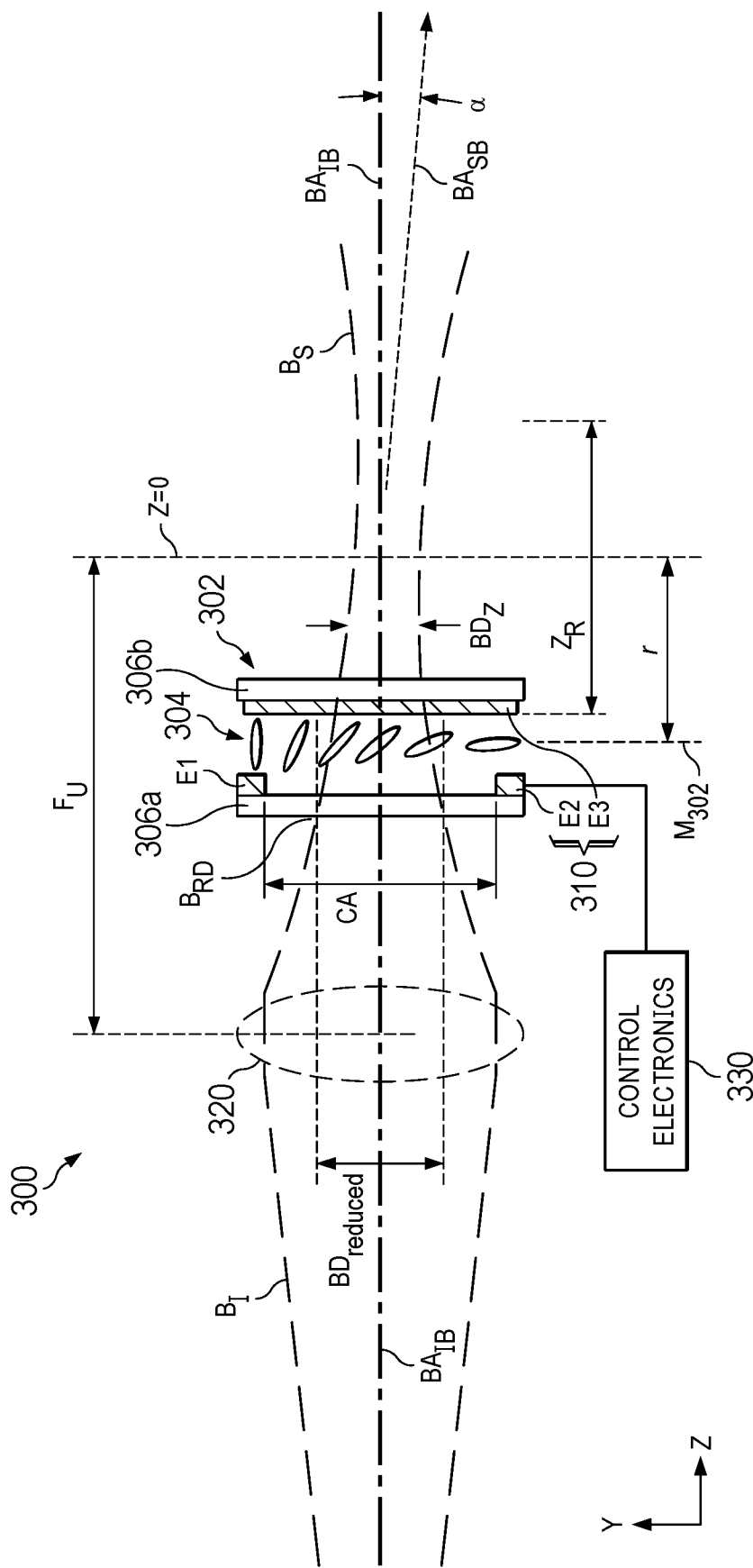
FIG. 3 shows a side cross-sectional view of an example embodiment of a beam steering system including an LC beam steering device and an upstream lens, according to one embodiment.

FIG. 3 shows a side cross-sectional view of an example embodiment of a beam steering system 300 according to the invention. The beam steering system 300 includes a LC beam steering device 302, an upstream lens 320 arranged upstream of the LC beam steering device 302, and control electronics 330. The LC beam steering device 302 includes a volume of LC molecules 304 arranged between an upstream substrate 306a and a downstream substrate 306b, and an electrode arrangement 310 provided on the respective substrates 306a and 306b. Substrates 306a and 306b may be formed from glass, plastic, or other suitable material or materials. In the illustrated embodiment, the electrode arrangement 310 comprises a three-electrode arrangement including (a) a pair of linear electrodes E1 and E2, each extending in the x-axis direction in FIG. 3, and (b) a planar electrode E3 extending in the x-axis direction and y-axis direction in FIG. 3. Linear electrodes E1 and E2 may be formed from indium tin oxide (ITO) or other suitable material, and planar electrode E3 may be formed from glass, plastic, or other suitable material. In other embodiments, the electrode arrangement 310 may include any other number, types, and arrangement of electrodes configured to affect a steering of light passing through the LC beam steering device 302.

The LC beam steering device 302 defines a clear aperture CA through which light can pass through the upstream substrate 306a to enter the LC beam steering device 302. In one embodiment, the CA is defined between the pair of linear electrodes E1 and E2.

As discussed below in more detail, the upstream lens 320 is configured to reduce a beam width of an input light beam $B_I$ to provide a reduced-diameter light beam $B_{RD}$ incident at the upstream substrate 306a of the LC beam steering device 302. LC beam steering device 302 is configured to directionally steer the reduced-diameter light beam $B_{RD}$, to output a directionally steered beam $B_S$ having a beam axis $BA_{SB}$ offset from a beam axis $BA_{IB}$ offset of the input light beam $B_I$ by a steering angle α, in the x-y plane in the example shown in FIG. 3.

Control electronics 330 may include any electronics configured to dynamically control the electrode arrangement 310 to influence the LC molecules 304 to affect a directional steering of the reduced-diameter beam $B_{RD}$ and thereby output a directionally steered beam $B_S$ at a steering angle α. For example, control electronics 330 may include a processor, logic instructions (e.g., stored in memory as software, or embodied in firmware), and a feedback control system configured to account for defined operating conditions, e.g., a temperature sensor and heater for temperature-based control. In some embodiments, control electronics 330 are configured to dynamically activate linear electrodes E1 and/or E2 (by dynamically adjusting a voltage applied to electrode E1 and/or electrode E2) to dynamically control the steering angle α of the directionally steered beam $B_S$.

The upstream lens 320 may include any one or more lens configured to (a) receive an input light beam $B_I$ from a light source (e.g., a light bulb, LED(s), laser, or LED pumped phosphor) and (b) reduce a beam width of the input light beam $B_I$ in at least one direction (e.g., a y-axis beam width, or both an x-axis beam width and y-axis beam width) to provide a reduced-diameter light beam $B_{RD}$ incident at the upstream substrate 306a of the LC beam steering device 302.

For example, in some embodiments the upstream lens 320 may comprise a cylindrical lens configured to reduce a beam width of the input light beam $B_I$ in the y-axis direction to provide a reduced-diameter light beam $B_{RD}$ (i.e., having a reduced-diameter in the y-axis direction) incident at the upstream substrate 306a. In such embodiments, a beam diameter $BD_{reduced}$ (i.e., a beam diameter in the y-axis direction) of the reduced-diameter light beam $B_{RD}$ incident at the upstream substrate 306a may be smaller than width of the clear aperture CA (in the y-axis direction). For example, the beam diameter $BD_{reduced}$ of the reduced-diameter light beam $B_{RD}$ incident at the upstream substrate 306a may be at least 5%, at least 10%, at least 20%, at least 30%, or at least 50% smaller than the width of the clear aperture CA (in the y-axis direction), depending on the particular embodiment.

As another example, in some embodiments the upstream lens 320 may comprise a cylindrical lens or circular lens, configured to reduce a beam width of the input light beam $B_I$ in one or both of the x-axis and y-axis directions to provide a reduced-diameter light beam $B_{RD}$ (i.e., having a reduced-diameter in both the x-axis and y-axis directions) incident at the upstream substrate 306a. In such embodiments, (a) the beam diameter $BD_{reduced}$ in the y-axis direction of the reduced-diameter light beam $B_{RD}$ incident at the upstream substrate 306a may be smaller than the width of the clear aperture CA in the y-axis direction, and (b) the beam diameter $BD_{reduced}$ in the x-axis direction of the reduced-diameter light beam $B_{RD}$ incident at the upstream substrate 306a may be smaller than the width of the clear aperture CA in the x-axis direction. For example, the beam diameter $BD_{reduced}$ may be smaller in both the y-axis direction and x-axis direction than the respective y-direction width and x-direction width of the clear aperture CA by at least 5%, at least 10%, at least 20%, at least 30%, or at least 50%, depending on the particular embodiment.

The upstream lens 320 and LC beam steering device 302 may be arranged at any suitable distance from each other, e.g., based on optical characteristics of the upstream lens 320 and/or LC beam steering device 302, to provide a desired beam steering efficiency and/or reduce unwanted beam steering effects. For example, in some embodiments, e.g., as shown in FIG. 3, a midplane $M_{302}$ of the LC beam steering device 302 may be arranged upstream of a focal plane Z=0 of the upstream lens 320 (defining a focal distance $F_U$ of the upstream lens 320) by a distance r. In some embodiments, distance r may be selected such that $0 < r < F_U$. For example, in some embodiments a distance r may be in the range of 0 to $0.5 * F_U$.

As another example, the LC beam steering device 302 may be arranged relative to a Rayleigh zone $Z_R$ of the upstream lens 320, wherein the Rayleigh zone is centered on the focal plane Z=0 of the upstream lens 320 and has a length defined by the beam diameter (focus spot) $BD_Z$ of the focused beam. In particular, the Rayleigh zone $Z_R$ is a zone within which the beam diameter $BD_Z$ of the focused beam changes less than by a factor of sqrt(2) relative to the minimal beam diameter $BD_{Z=0}$ at the focal plane Z=0 (also referred to as the focal spot size), such that the length of the Rayleigh zone may be expressed as: $Z_R \approx \pi \ (BD_{Z=0}/2)^2/\lambda$, where $\lambda$ represents the wavelength of the light. In other words, the Rayleigh zone $Z_R$ is a zone in which the focused beam is substantially collimated.

In some embodiments, the LC beam steering device 302 may be at least partially arranged in the Rayleigh zone $Z_R$ of the upstream lens 320, e.g., as shown in FIG. 3. For example, at least the downstream substrate 306b may be arranged in the Rayleigh zone $Z_R$. As another example, the midplane $M_{302}$ of the LC beam steering device 302 may be arranged in the Rayleigh zone $Z_R$ (in other words, $r<\frac{1}{2}Z_R$, with respect to distance r discussed above). As another example, the upstream substrate 306a may be arranged in the Rayleigh zone $Z_R$.

Figure 4:
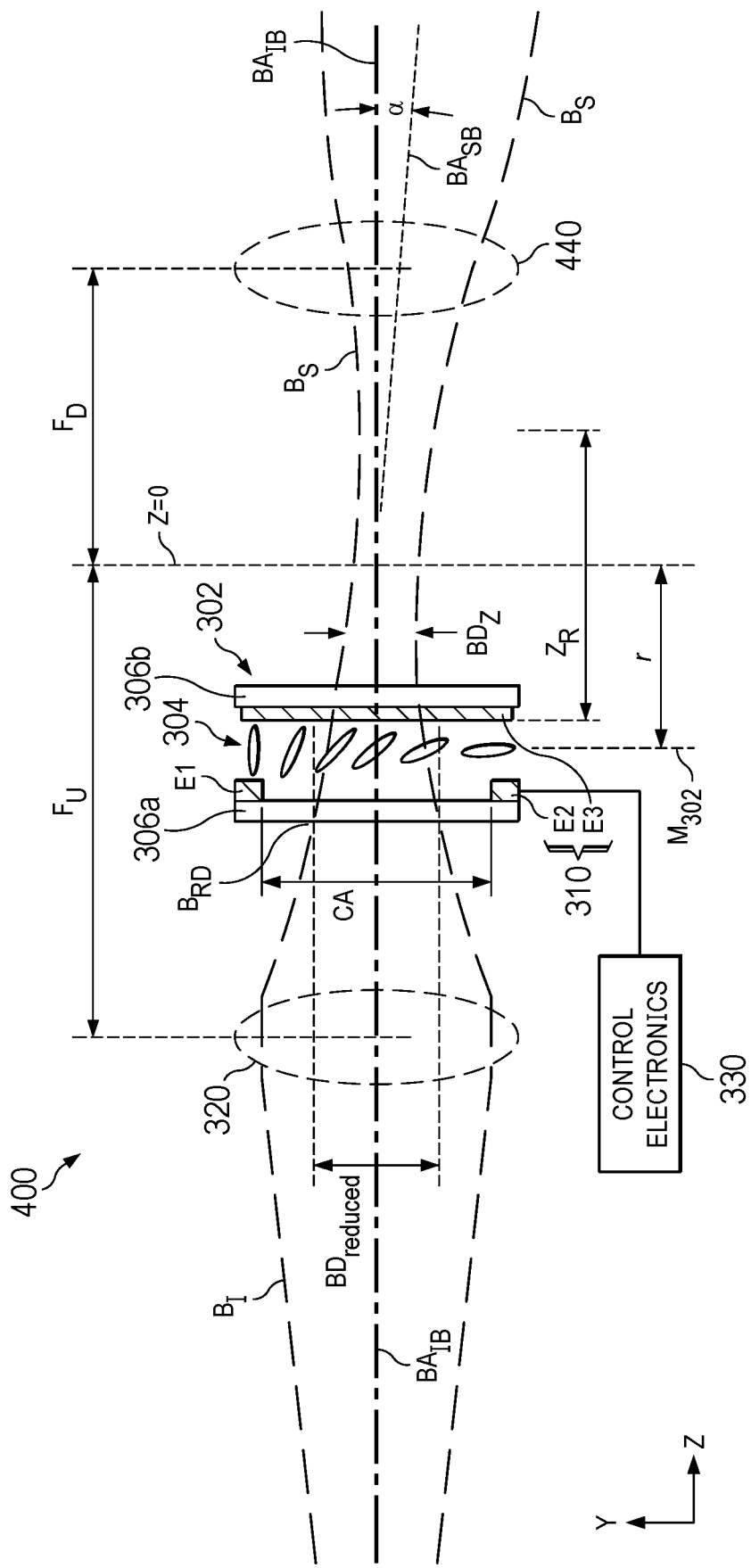
FIG. 4 shows a side cross-sectional view of an example embodiment of a beam steering system including an LC beam steering device, an upstream lens, and a downstream lens, according to one embodiment.

FIG. 4 shows a side cross-sectional view of an example embodiment of a beam steering system 400 according to the invention. Beam steering system 400 includes the LC beam steering device 302, upstream lens 320 arranged upstream of the LC beam steering device 302, and control electronics 330 of beam steering system 300 discussed above. Beam steering system 400 also includes a downstream lens 440 arranged downstream of the upstream lens 320. The downstream lens 440 may include any one or more lens configured to influence (e.g., reduce or increase) the beam width of light propagated by the downstream lens 440.

In the example embodiment shown in FIG. 4, the downstream lens 440 is arranged downstream of the LC beam steering device 302, and configured to influence (e.g., reduce) the beam width of the directionally steered beam $B_S$ output by the LC beam steering device 302. In such embodiment, downstream lens 440 may comprise a cylindrical lens, a spherical lens, a hexagonal, or any other suitable type(s) of lens(es). In other embodiments, each downstream lens may be arranged between the upstream lens 320 and LC beam steering device 302 (i.e., upstream of the LC beam steering device 302) to influence (e.g., collimate) the beam prior to reaching the LC beam steering device 302. In such embodiment, downstream lens 440 may comprise enough lenses to cover the entire aperture of the beam or any other suitable type(s) of lens(es).

In the embodiment shown in FIG. 4, the downstream lens 440 has a focal length $F_D$ shorter than the focal length $F_U$ of the upstream lens 320. For example, a ratio of the upstream lens focal length $F_U$ to the downstream lens focal length $F_D$ may be in the range of 1 to 5, and in particular embodiments between 2 and 4.

As discussed above, some embodiments include a multi-segment beam steering device, for example to produce an increased steering angle $\alpha$. In such embodiments, an upstream lens array including multiple upstream lenses (or "lenslets") may be provided to pre-condition light before reaching the multi-segment beam steering device, with each upstream lens in the upstream lens array pre-conditioning a respective light beam before reaching a corresponding LC beam steering segment in the multi-segment beam steering device.

Figure 5:
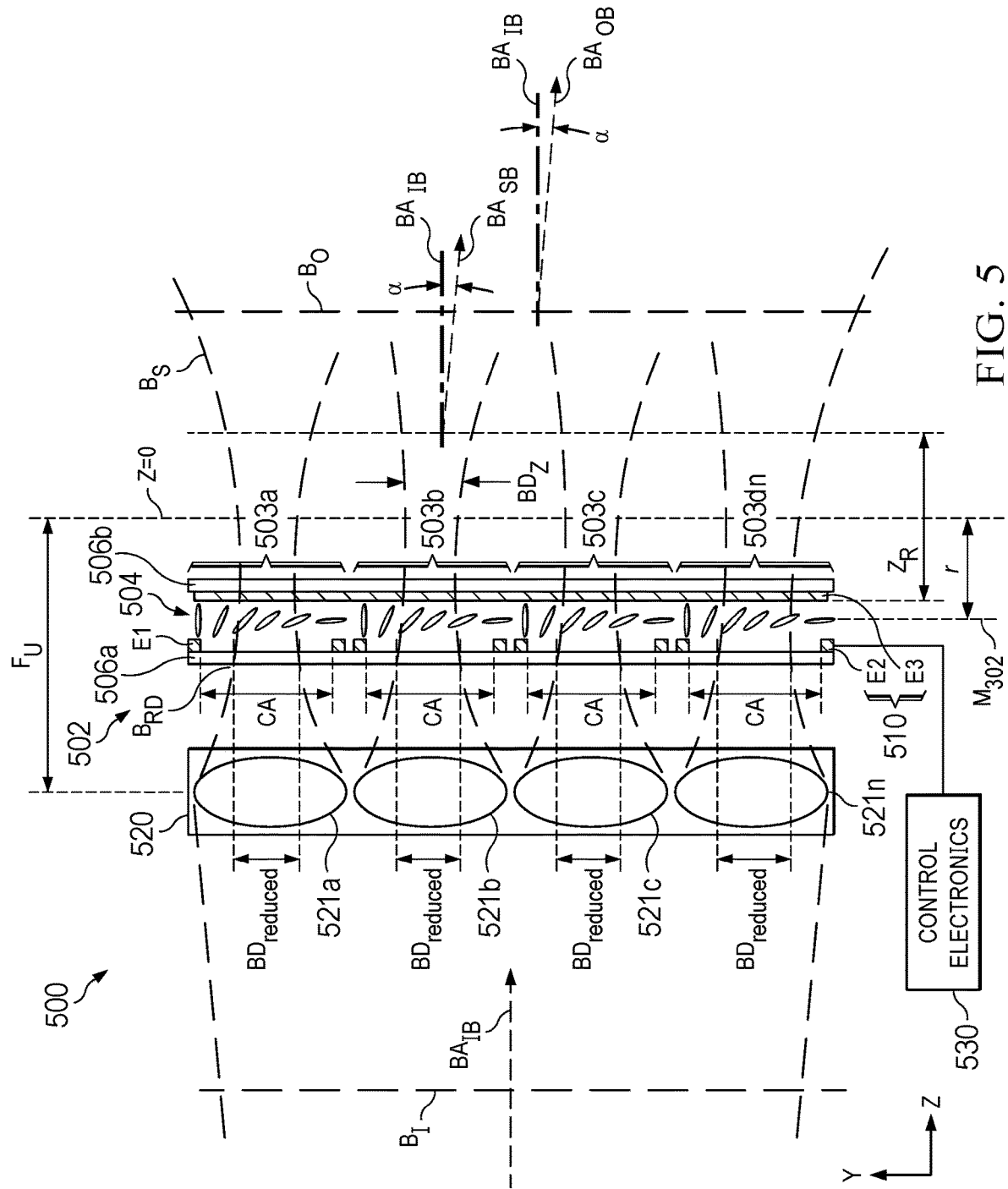
FIG. 5 shows a side cross-sectional view of an example embodiment of a beam steering system including a multi-segment LC beam steering device and an upstream lens array, according to one embodiment.

FIG. 5 shows a side cross-sectional view of an example embodiment of a beam steering system 500 including a multi-segment beam steering device 502, an upstream lens array 520 arranged upstream of the multi-segment beam steering device 502, and control electronics 530. The multi-segment beam steering device 502 includes an array of multiple LC beam steering segments 503a-503n. The array of LC beam steering segments 503a-503n may include any number of LC beam steering segments, arranged in a one-dimensional array (e.g., extending in the y-axis direction) or a two-dimensional array (e.g., extending in the y-axis direction and x-axis direction).

Each LC beam steering segment 503a-503n includes a respective volume of LC molecules 504 arranged between an upstream substrate 506a and a downstream substrate 506b, and an electrode arrangement 510 provided on the respective substrates 506a and 506b. Substrates 506a and 506b may be formed from glass, plastic, or other suitable material or materials. In the illustrated embodiment, the electrode arrangement 510 comprises a three-electrode arrangement for each LC beam steering segment 503a-503n, including (a) a respective pair of linear electrodes E1 and E2 provided on substrates 506a, and (b) a planar electrode E3 (shared by LC beam steering segment 503a-503n). In other embodiments, the electrode arrangement 310 may include any other number, types, and arrangement of electrodes configured to affect a steering of light passing through LC beam steering segments 503a-503n.

Each LC beam steering segment 503a-503n defines a respective clear aperture CA through which light can pass through the upstream substrate 506a to enter the LC beam steering device 502. In one embodiment, each respective clear aperture CA is defined between a pair of linear electrodes E1 and E2 of the respective LC beam steering segment 503a-503n.

As discussed below in more detail, the upstream lens array 520 is configured to provide a respective reduced-diameter light beam $B_{RD}$ to each respective LC beam steering segment 503a-503n. Each LC beam steering segment 503a-503n is configured to directionally steer the respective reduced-diameter light beam $B_{RD}$ to output a respective directionally steered beam $B_S$ having a beam axis $BA_{SB}$ offset from a beam axis $BA_{IB}$ offset of the input light beam $B_I$ by a steering angle $\alpha$, such that the multi-segment beam steering device 502 outputs an array of directionally steered beam $B_S$ (e.g., a one-dimensional array or two-dimensional array of directionally steered beam $B_S$) at the steering angle $\alpha$. As shown in FIG. 5, the array of directionally steered beam $B_S$ combine to form a combined output beam $B_O$ propagating at the steering angle $\alpha$.

Control electronics 530 may include any electronics configured to dynamically control the electrode arrangement 510 to influence the LC molecules 504 to affect a directional steering provided by each LC beam steering segment 503a-503n, to thereby output an array of directionally steered beams $B_S$ at a steering angle $\alpha$. For example, control electronics 530 may include a processor, logic instructions (e.g., stored in memory as software, or embodied in firmware), and a feedback-based control system, e.g., for temperature-based control of certain operational parameters. In some embodiments, control electronics 330 are configured to dynamically activate linear electrodes E1 and/or E2 (by dynamically adjusting a voltage applied to electrode E1 and/or electrode E2) to dynamically control the steering angle $\alpha$ of the directionally steered beam $B_S$.

The upstream lens array 520 includes an array of upstream lens elements 521a-521n, corresponding with the array of LC beam steering segment 503a-503n. Each upstream lens elements 521a-521n is configured to (a) receive a respective light beam (e.g., a respective portion of an input light beam $B_I$ from a light source, e.g., a light bulb, LED(s), laser, or LED pumped phosphor) and (b) reduce a beam width of the received light beam in at least one direction (e.g., a y-axis beam width, or both an x-axis beam width and y-axis beam width) to provide a reduced-diameter light beam $B_{RD}$ incident at a corresponding LC beam steering segment 503a-503n.

For example, in some embodiments upstream lens array 520 includes an array of cylindrical lens elements 521a-521n configured to influence light in the y-axis direction. Each cylindrical lens elements 521a-521n is configured to reduce a beam width of a received light beam (a respective portion of the input beam $B_I$) in the y-axis direction to provide a respective reduced-diameter light beam $B_{RD}$ (i.e., having a reduced-diameter in the y-axis direction) incident at a corresponding LC beam steering segment 503a-503n (e.g., incident at the upstream substrate 506a). In such embodiments, the beam diameter $BD_{reduced}$ of the respective reduced-diameter light beam $B_{RD}$ incident at each respective LC beam steering segment 503a-503n may be smaller than width of the respective clear aperture CA (in the y-axis direction). For example, the beam diameter $BD_{reduced}$ of each reduced-diameter light beam $B_{RD}$ incident at each respective LC beam steering segment 503a-503n may be at least 5%, at least 10%, at least 20%, at least 30%, or at least 50% smaller than the width of the respective clear aperture CA (in the y-axis direction), depending on the particular embodiment.

As another example, in some embodiments upstream lens array 520 includes an array of circular, cylindrical or hexagonal lens elements 521a-521n configured to influence light in the y-axis direction and the x-axis direction. Each lens elements 521a-521n is configured to reduce a beam width of a received light beam (a respective portion of the input beam $B_I$) in both the x-axis and y-axis directions to provide a respective reduced-diameter light beam $B_{RD}$ (i.e., having a reduced-diameter in both the x-axis and y-axis directions) incident at a corresponding LC beam steering segment 503a-503n (e.g., incident at the upstream substrate 506a). In such embodiments, the beam diameter $BD_{reduced}$ in both the y-axis direction and x-axis direction of the respective reduced-diameter light beam $B_{RD}$ incident at each respective LC beam steering segment 503a-503n may be smaller than the width of the respective clear aperture CA in both the y-axis direction and x-axis direction, respectively. For example, the beam diameter $BD_{reduced}$ of each respective reduced-diameter light beam $B_{RD}$ may be smaller in both the y-axis direction and x-axis direction than the respective y-direction width and x-direction width of the corresponding clear aperture CA by at least 5%, at least 10%, at least 20%, at least 30%, or at least 50%, depending on the particular embodiment.

As discussed above regarding upstream lens 320 and LC beam steering device 302 of system 300 shown in FIG. 3, the upstream lens array 520 and multi-segment LC beam steering device 502 may be arranged at any suitable distance from each other, e.g., based on optical characteristics of the upstream lens array 520 and/or multi-segment LC beam steering device 502, to provide a desired beam steering efficiency and/or reduce unwanted beam steering effects. For example, in some embodiments, e.g., as shown in FIG. 5, a midplane $M_{302}$ of the multi-segment LC beam steering device 502 may be arranged upstream of a focal plane Z=0 of the upstream lens array 520 (defining a focal distance $F_U$ of the upstream lens elements 521a-521n) by a distance r. In some embodiments, distance r may be selected such that $0 < r < F_U$. For example, in some embodiments a distance r in the range of 0 to $0.5 * F_U$.

As another example, the multi-segment LC beam steering device 502 may be arranged relative to the Rayleigh zone $Z_R$ of the upstream lens array 520. In some embodiments, the multi-segment LC beam steering device 502 may be at least partially arranged in the Rayleigh zone $Z_R$ of the upstream lens array 520, e.g., as shown in FIG. 5. For example, at least the downstream substrate 506b may be arranged in the Rayleigh zone $Z_R$. As another example, the midplane $M_{502}$ of the multi-segment LC beam steering device 502 may be arranged in the Rayleigh zone $Z_R$ (in other words, $r < \frac{1}{2} Z_R$, with respect to distance r discussed above). As another example, the upstream substrate 506a may be arranged in the Rayleigh zone $Z_R$.

Figure 6:
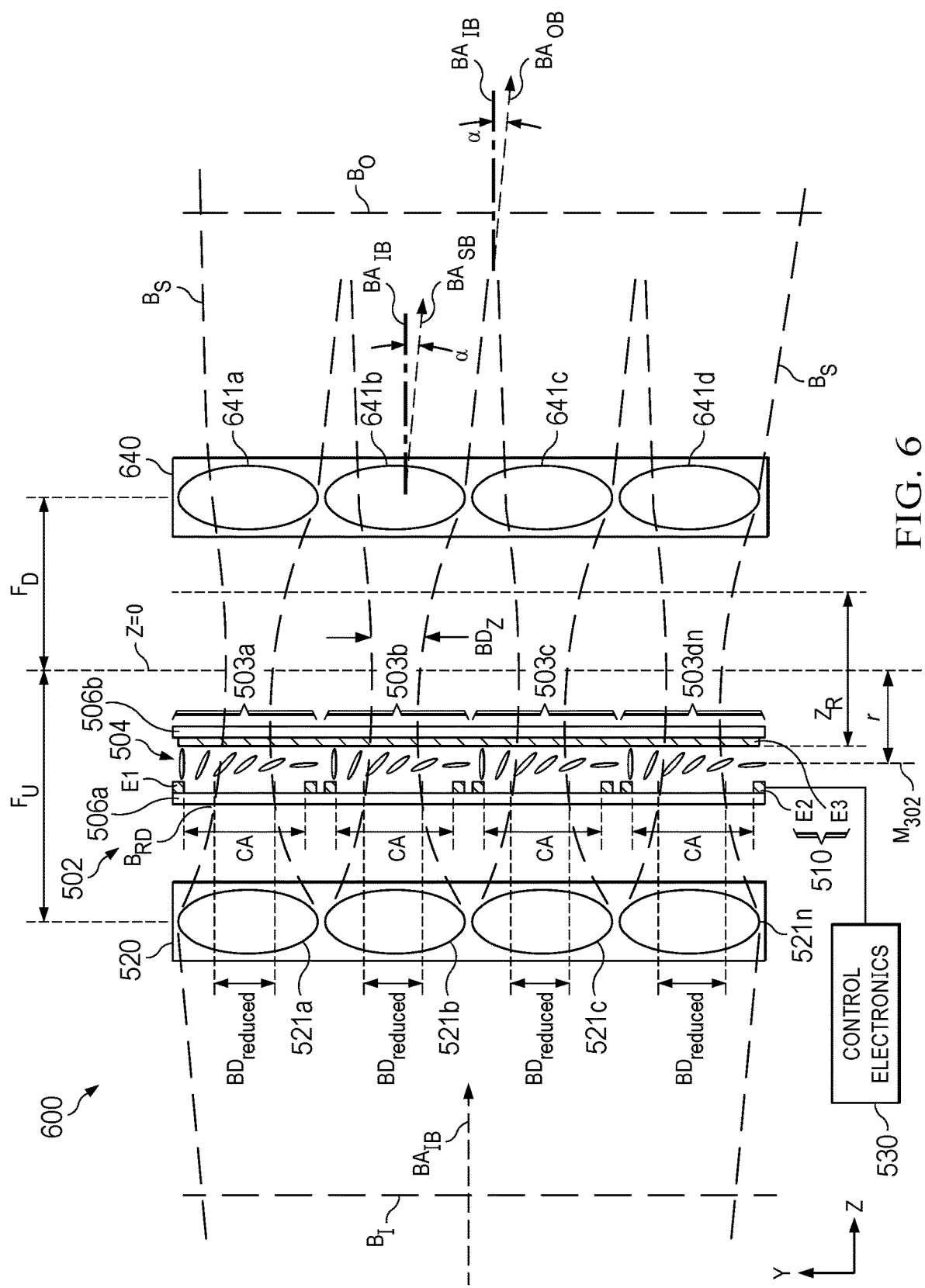
FIG. 6 shows a side cross-sectional view of an example embodiment of a beam steering system including a multi-segment LC beam steering device, an upstream lens array, and a downstream lens array, according to one embodiment.

FIG. 6 shows a side cross-sectional view of another example embodiment of a beam steering system 600 according to the invention. Beam steering system 600 includes the multi-segment LC beam steering device 502, upstream lens array 520 arranged upstream of the multi-segment LC beam steering device 502, and control electronics 530 of beam steering system 500 discussed above. As discussed above, the upstream lens array 520 includes an array (e.g., one-dimensional array or two-dimensional array) of upstream lens elements 521a-521n configured to influence an input light beam $B_I$ to provide an array of reduced-diameter light beam $B_{RD}$, and the multi-segment beam steering device 502 includes a corresponding array of LC beam steering segments 503a-503n configured to directionally steer the array of reduced-diameter light beam $B_{RD}$ to output an array of directionally steered beam $B_S$. Each directionally steered beam $B_S$ may have a beam axis $BA_{SB}$ offset from a beam axis $BA_{IB}$ offset of the input light beam $B_I$ by a steering angle α.

Beam steering system 600 also includes a downstream lens array 640 arranged downstream of the upstream lens array 520. The downstream lens array 640 may include any one or more lens configured to influence (e.g., reduce or increase) the beam width of light propagated by the downstream lens array 640.

In the example embodiment shown in FIG. 6, the downstream lens array 640 is arranged downstream of the multi-segment LC beam steering device 502, and configured to further influence the directionally steered beams $B_S$ output by the multi-segment LC beam steering device 502. Downstream lens array 640 may comprise an array of downstream lenses 641a-641n (e.g., one-dimensional array or two-dimensional array) corresponding with the array of LC beam steering segments 503a-503n. For example, each downstream lens 641a-641n may be configured to receive and influence (e.g., reduce) the beam width of the directionally steered beam $B_S$ output by a corresponding LC beam steering segment 503a-503n, e.g., to reduce a divergence of the light output by beam steering system 600. In some embodiments, the downstream lens array 640 may comprise an array of cylindrical lenses, spherical lenses, hexagonal, or any other suitable type(s) of lenses 641a-641n configured to influence the light output by multi-segment LC beam steering device 502.

As shown in FIG. 6, the array of directionally steered beam $B_S$ may combine downstream of the downstream lens array 640 to form a combined output beam $B_O$ propagating at the steering angle α. In some embodiments, e.g., as shown in FIG. 6, the downstream lens array 640 may reduce a divergence of the combined output beam $B_O$, e.g., as compared with system 500 without such the downstream lens array.

The focal length $F_D$ of the downstream lens array 640 may be shorter than, the same as, or longer than the focal length $F_U$ of the upstream lens array 520, depending on the particular embodiment. In the embodiment shown in FIG. 6, the downstream lens array 640 has a shorter focal length $F_D$ than the focal length $F_U$ of the upstream lens array 520. For example, a ratio of the focal length $F_U$ of the upstream lens array 520 to the focal length $F_D$ of the downstream lens array 640 may be in the range of 1 to 5, and in particular embodiments between 2 and 4. As shown in FIG. 7A-8B discussed below, using a downstream lens array with a shorter focal length $F_D$ than the of the upstream lens array focal length $F_U$ may result in or allow for a greater beam steering angle α.

Figure 10:
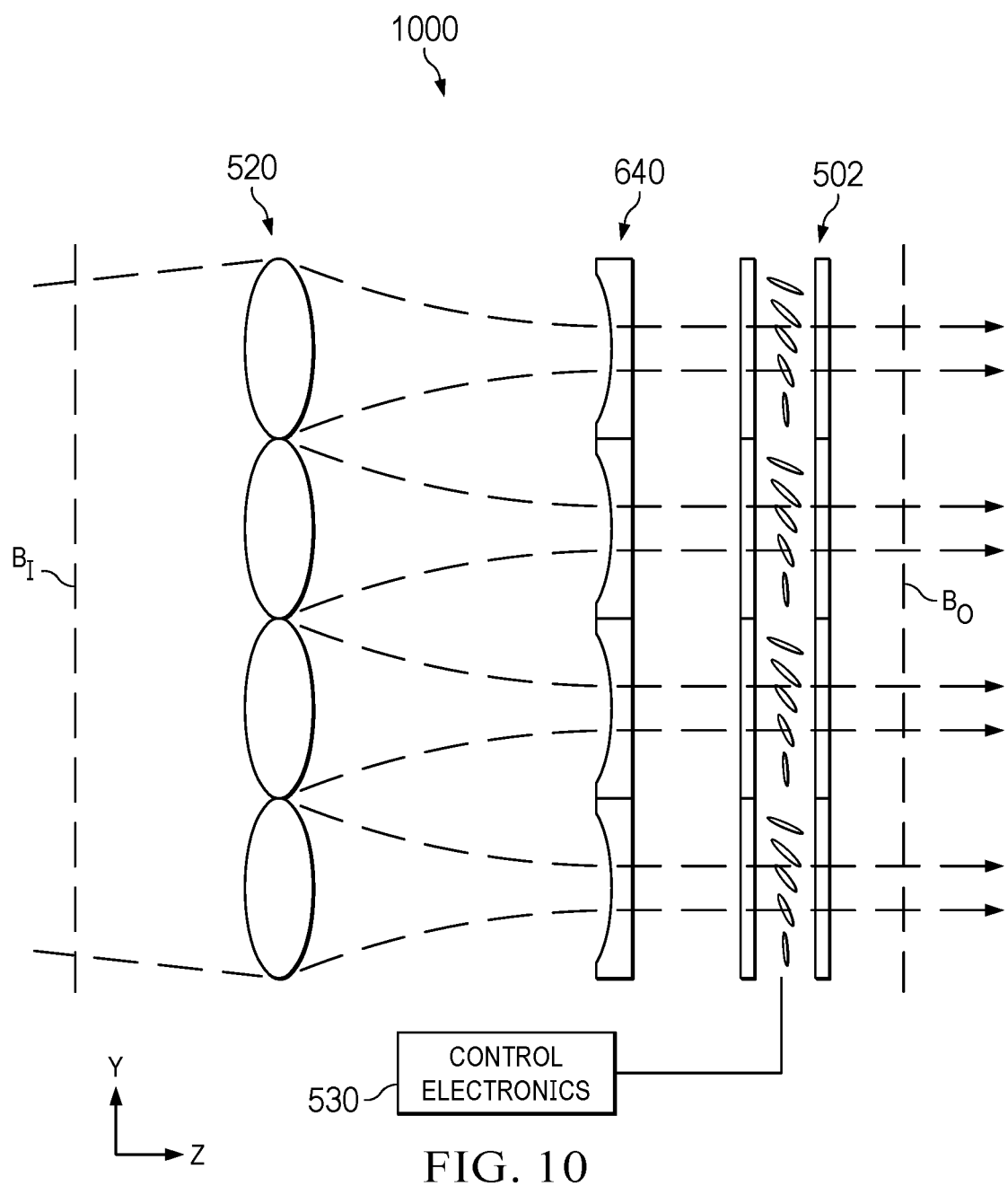
FIG. 10 shows a side cross-sectional view of an example beam steering system including a defocusing downstream lens array arranged between a focusing upstream lens array and a multi-segment LC beam steering device, according to one embodiment.

In other embodiments, e.g., as shown in FIG. 10 discussed below, a downstream lens array may be arranged between an upstream lens array and a multi-segment LC beam steering device (i.e., upstream of the multi-segment LC beam steering device) to influence (e.g., collimate) the beams output by the upstream lens array prior to reaching the multi-segment LC beam steering device 502. In such embodiment, the downstream lens array may comprise an array of lenses providing a collective optical aperture suitable to cover an entire incident beam (or desired portion thereof), or any other suitable type(s) of lenses.

Figure 7A:
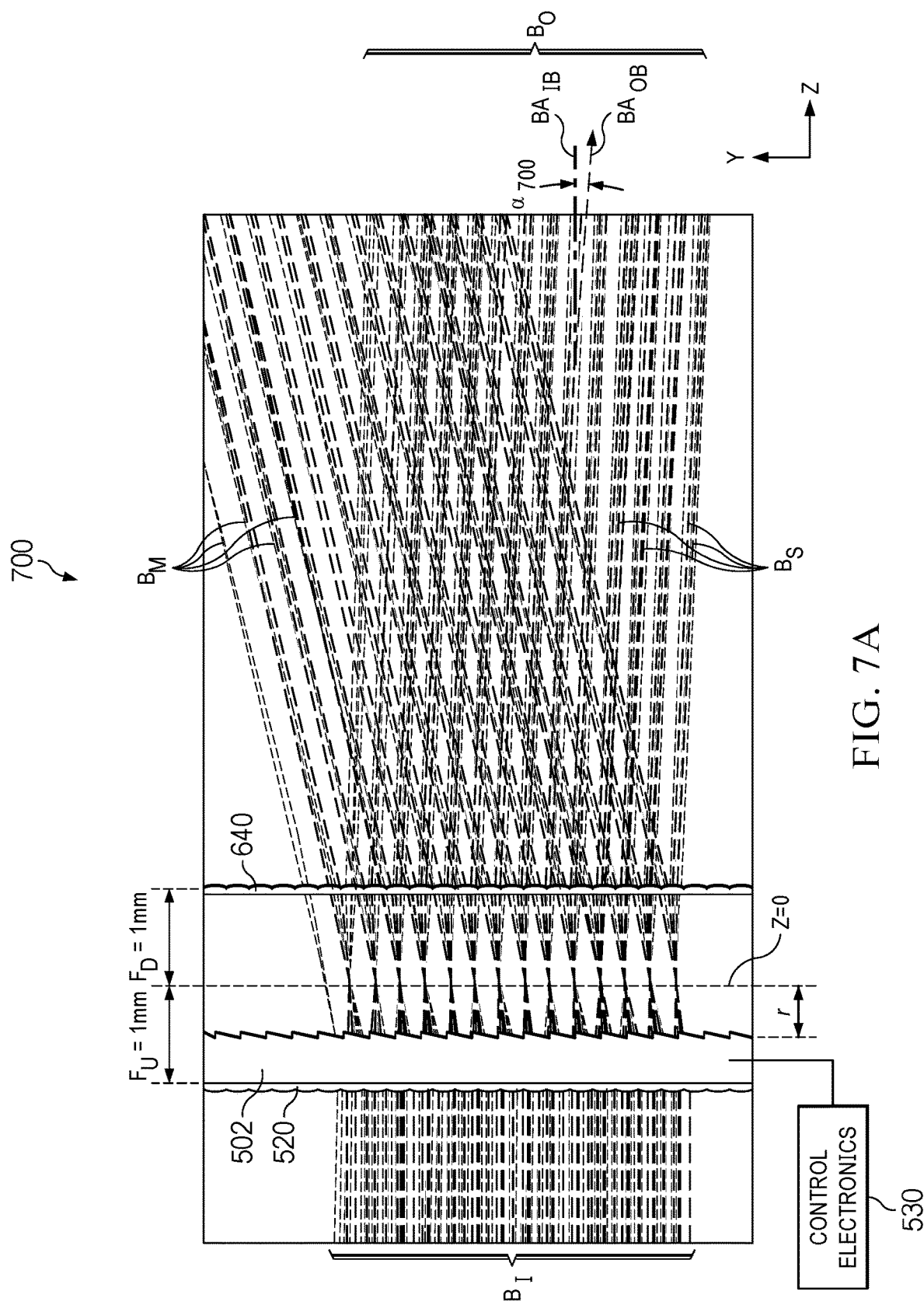
FIG. 7A shows a side cross-sectional view of an example beam steering system including upstream and downstream lens arrays with similar focal lengths, showing propagation of light through the beam steering system, according to one embodiment.
Figure 7B:
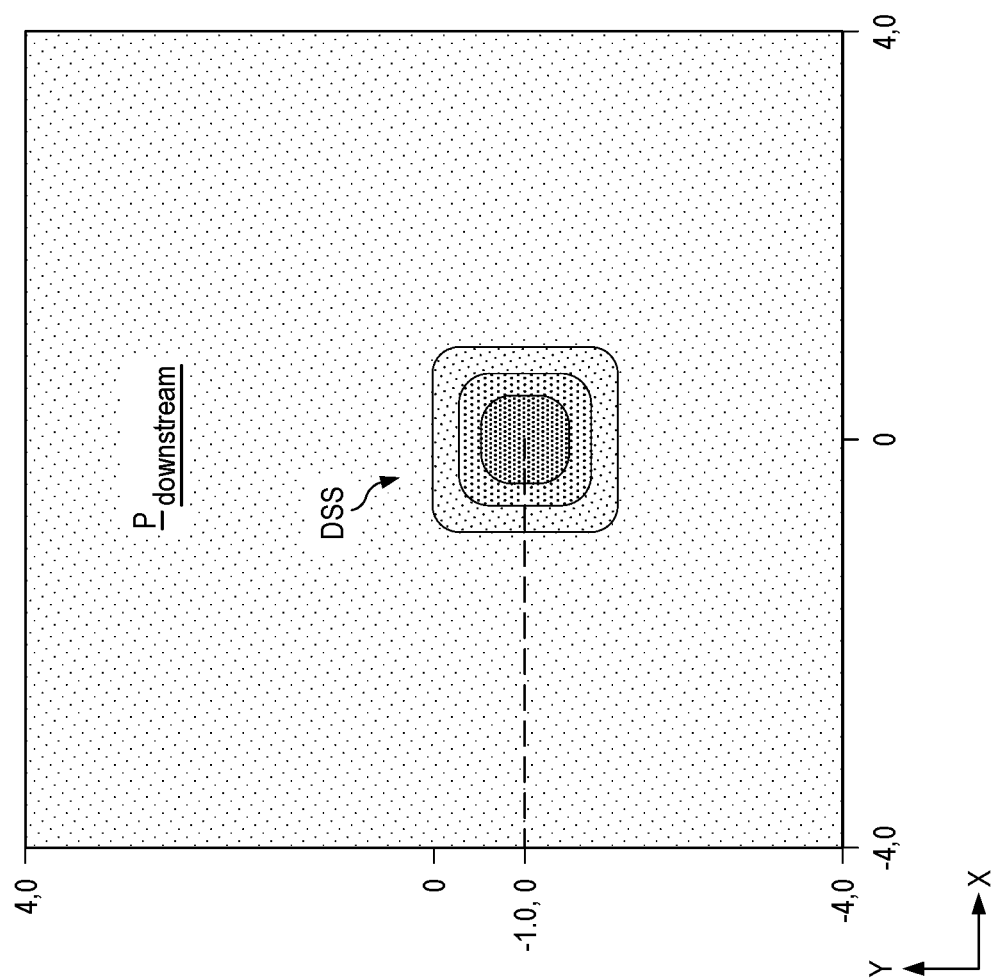
FIG. 7B shows a directionally steered spot formed by the output of the example beam steering system shown in FIG. 7A.

FIG. 7A shows a side cross-sectional view of an example beam steering system 700 comprising a first implementation of the example beam steering system 600 shown in FIG. 6. FIG. 7B shows a directionally steered spot (DSS) created by an output beam $B_O$ at an x-y plane $P_{downstream}$ downstream of the beam steering system 700 by a defined distance.

As shown in FIG. 7A, beam steering system 700 includes a multi-segment LC beam steering device 502 arranged between an upstream lens array 520 and a downstream lens array 640, and a control electronics 530 configured to dynamically control the multi-segment LC beam steering device 502, e.g., as discussed above. The illustrated example includes a one-dimensional array of elements (i.e., LC beam steering segments, upstream lens elements, and downstream lens elements) extending in the y-axis direction. Other embodiments may include a two-dimensional array of elements (i.e., LC beam steering segments, upstream lens elements, and downstream lens elements) extending in the x-axis and y-axis directions. In the illustrated example, the upstream lens array 520 and the downstream lens array 640 have the same focal length ($F_U=F_D=1$ mm), and the multi-segment LC beam steering device 502 is arranged upstream focal plane (Z=0) of the upstream lens array 520 by a distance r=1 mm.

As shown, beam steering system 700, when activated by control electronics 530, outputs:
(a) an array of directionally steered beams $B_S$ collectively forming an output beam $B_O$ having a beam axis $BA_{OB}$ offset from a beam axis $BA_{IB}$ of the input beam $B_I$ by a beam steering angle $α_{700}$, which forms the directionally steered spot DSS shown in FIG. 7B, and
(b) an array of misdirected beams $B_M$, which collectively form a satellite spot in the plane of FIG. 7B but outside the extent of the area shown in FIG. 7B.

As shown in FIG. 7B, the beam steering angle $α_{700}$ of the output beam $B_O$ steers the directionally steered spot DSS downward (in the negative y-direction) by an offset of about 1.0 degree from the beam axis $BA_{IB}$ of the input beam $B_I$ (indicated at point 0, 0).

Figure 8A:
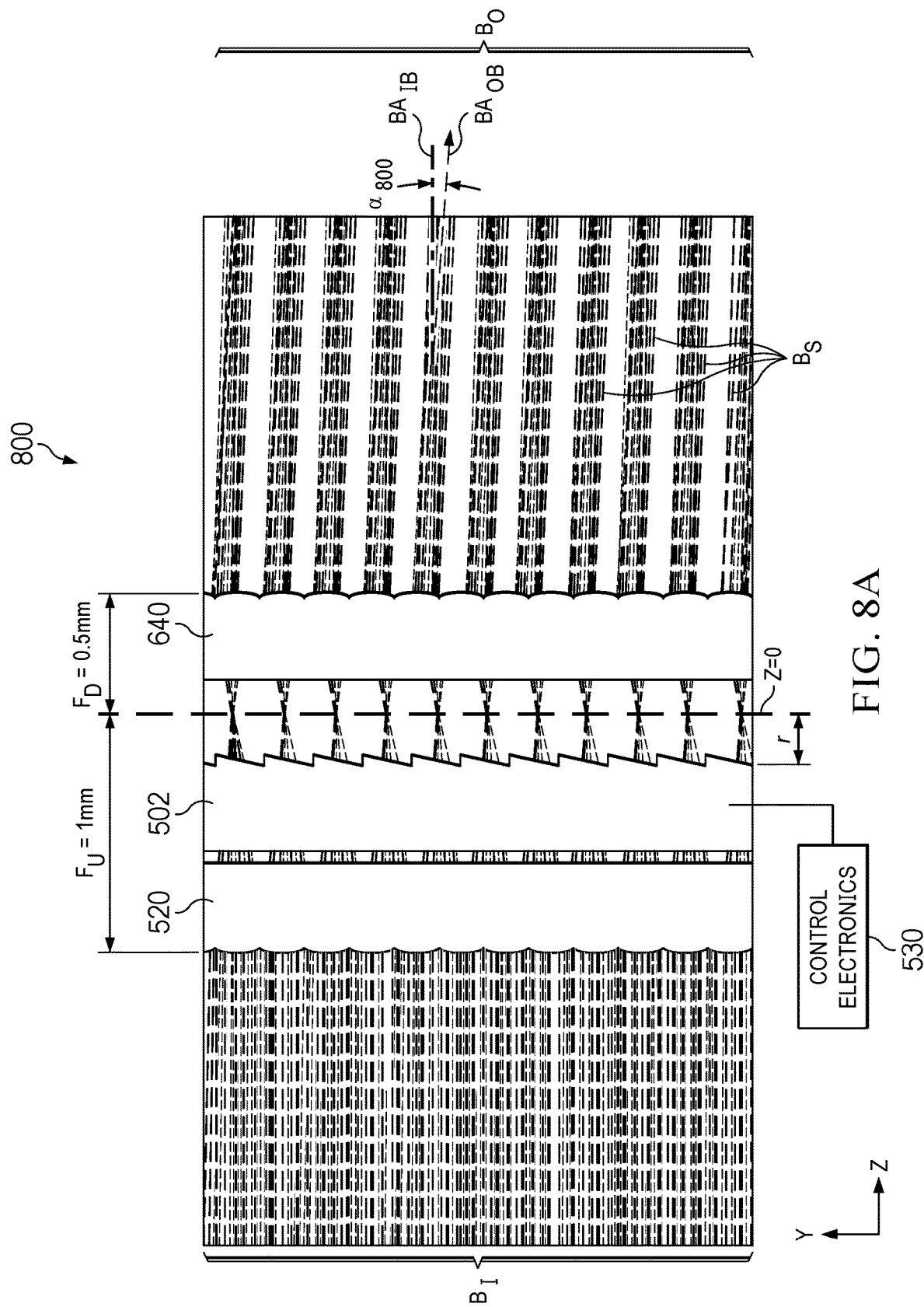
FIG. 8A shows a side cross-sectional view of another example beam steering system including upstream and downstream lens arrays with different focal lengths, showing propagation of light through the beam steering system, according to one embodiment.
Figure 8B:
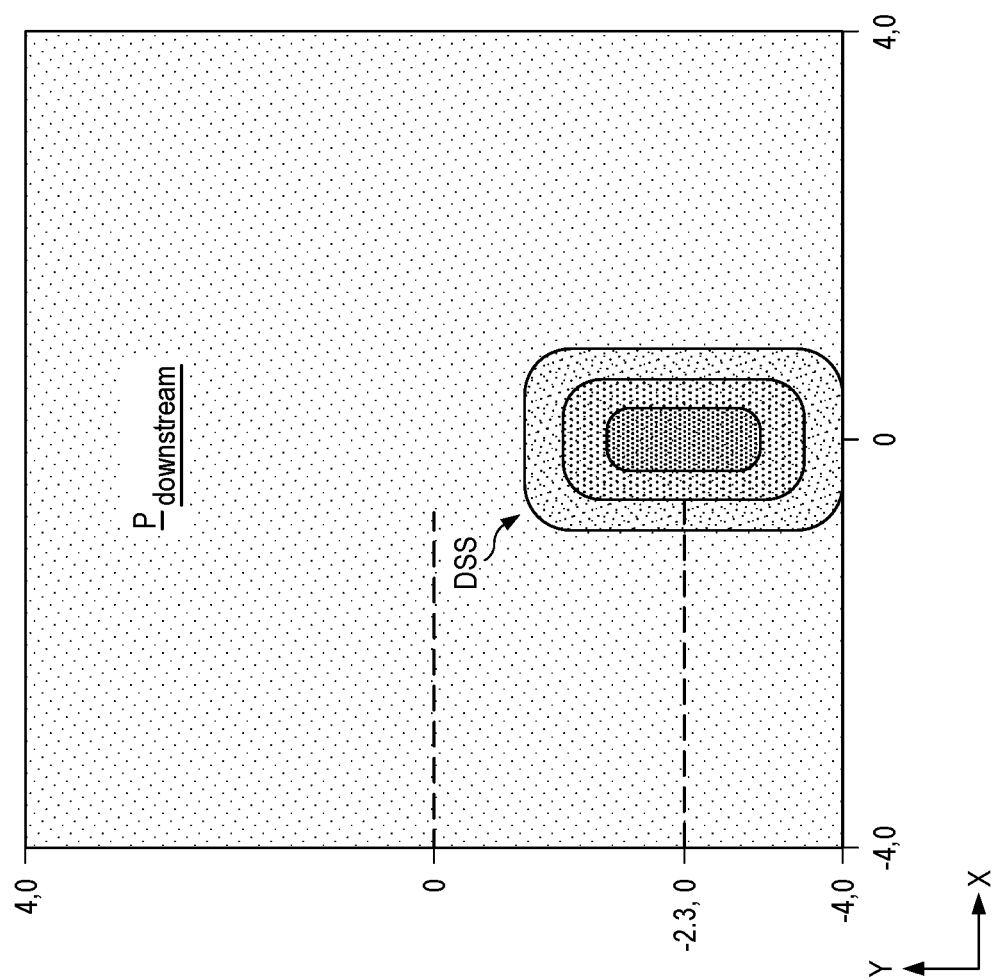
FIG. 8B shows a directionally steered spot formed by the output of the example beam steering system shown in FIG. 8A.

FIG. 8A shows a side cross-sectional view of an example beam steering system 800 comprising a second implementation of the example beam steering system 600 shown in FIG. 6. FIG. 8B shows a directionally steered spot DSS created by an output beam $B_O$ at an x-y plane $P_{downstream}$ downstream of the beam steering system 700 by the same defined distance as the downstream plane $P_{downstream}$ shown in FIG. 7B discussed above.

As shown in FIG. 8A, beam steering system 800 includes a multi-segment LC beam steering device 502 arranged between an upstream lens array 520 and a downstream lens array 640, and a control electronics 530 configured to dynamically control the multi-segment LC beam steering device 502, e.g., similar to beam steering system 700 discussed above. However, in contrast to beam steering system 700 discussed above, in beam steering system 800 the upstream lens array 520 has a longer focal length ($F_U=1$ mm) than the focal length of the downstream lens array 640 ($F_D=0.5$ mm). The multi-segment LC beam steering device 502 is arranged upstream focal plane (Z=0) of the upstream lens array 520 by a distance r=1 mm.

As shown, beam steering system 700, when activated by control electronics 530, outputs an array of directionally steered beams $B_S$ collectively forming an output beam $B_O$ having a beam axis $BA_{OB}$ offset from a beam axis $BA_{IB}$ of the input beam $B_I$ by a beam steering angle $α_{800}$, which forms the directionally steered spot DSS shown in FIG. 8B. As shown in FIG. 8B, the beam steering angle $α_{800}$ of the output beam $B_O$ steers the directionally steered spot DSS downward (in the negative y-direction) by an offset of about 2.3 degrees from the beam axis $BA_{IB}$ of the input beam $B_I$ (indicated at point 0, 0).

Thus, by comparing FIGS. 7A-7B with FIGS. 8A-8B, in some embodiments the directional steering of the output beam $B_O$ may be increased by using an upstream lens array 520 with a longer focal length ($F_U$) than the downstream lens array 640 ($F_D$). As noted above, in some embodiments, an upstream lens array 520 and downstream lens array 640 may be selected with a focal length ratio $F_U/F_D$ in the range of 1 to 5, for example between 2 and 4 in particular embodiments.

In addition, as shown in FIG. 8A, using an upstream lens array 520 with a longer focal length ($F_U$) than that the downstream lens array 640 focal length ($F_U$), in combination with additional aspects of the example beam steering system 800 (e.g., arranging the multi-segment LC beam steering device 502 upstream of the upstream lens array focal plane (Z=0)), may substantially eliminate the presence of misdirected beams $B_M$ (see FIG. 7A for comparison), and thereby increase a beam steering efficiency provided by the beam steering system.

Figure 9:
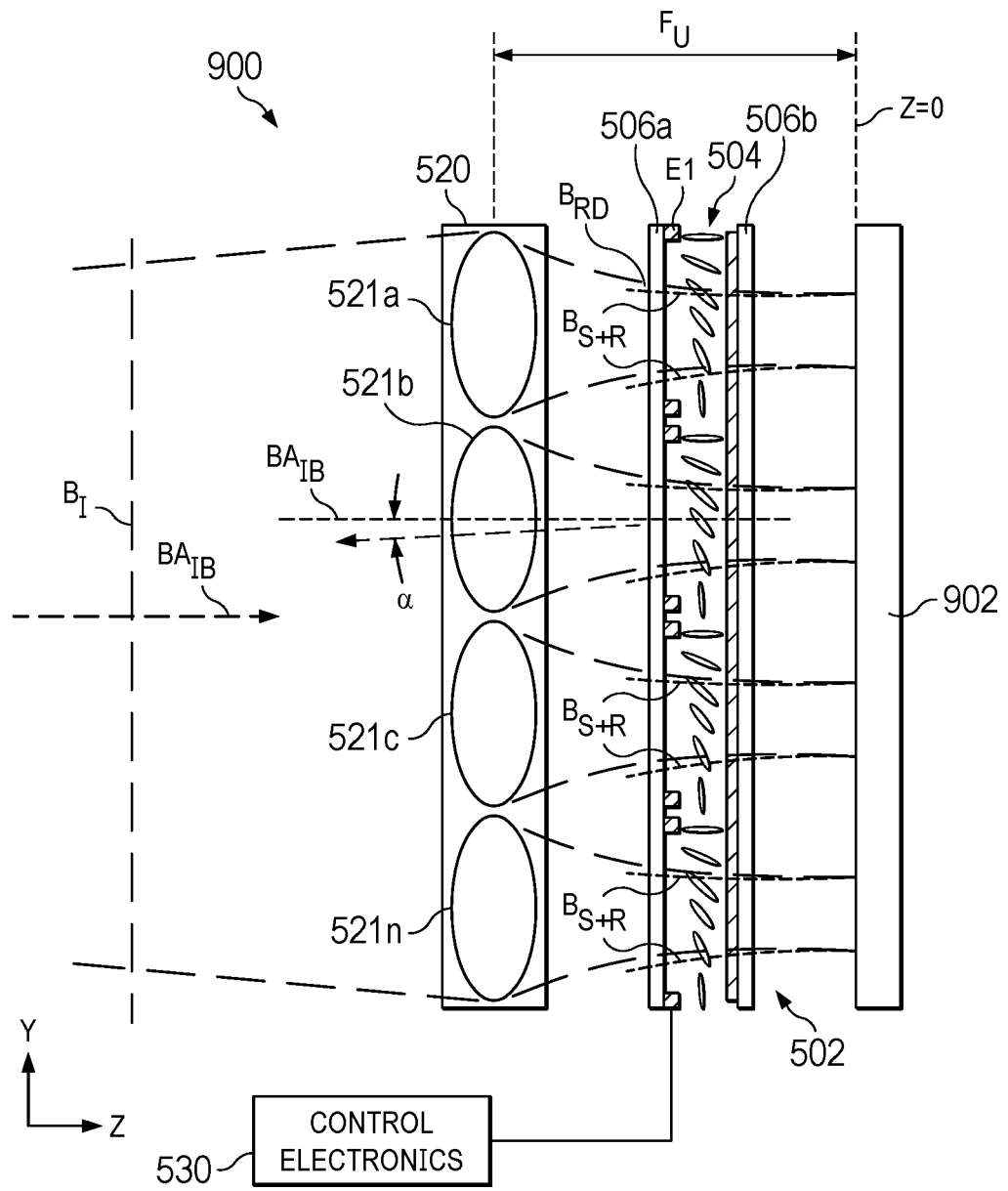
FIG. 9 shows a side cross-sectional view of an example beam steering system including an upstream lens array, a multi-segment LC beam steering device, and a downstream mirror, according to one embodiment.

FIG. 9 shows a side cross-sectional view of another example embodiment of a beam steering system 900 according to the invention. Like beam steering systems 500 and 600 discussed above, beam steering system 900 includes the multi-segment LC beam steering device 502, upstream lens array 520 arranged upstream of the multi-segment LC beam steering device 502, and control electronics 530 of beam steering system 500 discussed above. Beam steering system 900 also includes a mirror 902 configured to reflect the array of directionally steered beam $B_S$ output by the array of LC beam steering segments 503a-503n of multi-segment LC beam steering device 502, to thereby propagate an array of steered and reflected beams $B_{S+R}$. The array of steered and reflected beams $B_{S+R}$ may be propagated back through the multi-segment LC beam steering device 502, or may be reflected in any other desired direction.

FIG. 10 shows a side cross-sectional view of another example embodiment of a beam steering system 1000 according to the invention. Like beam steering systems 500 and 600 discussed above, beam steering system 1000 includes the multi-segment LC beam steering device 502, upstream lens array 520, downstream lens array 640, and control electronics 530 configured to control the multi-segment LC beam steering device 502. However, in beam steering system 1000 the downstream lens array 640 is arranged upstream of the multi-segment LC beam steering device 502, i.e., between the upstream lens array 520 and the multi-segment LC beam steering device 502. The downstream lens array 640 is configured to influence (e.g., collimate) the array of beams output by the upstream lens array 520 prior to reaching the multi-segment LC beam steering device 502. In such embodiment, the downstream lens array 640 may comprise an array of lenses sufficient to cover the entire transverse plane of the incident beam (or desired portion thereof), or any other suitable type(s) of lenses.

Figure 11:
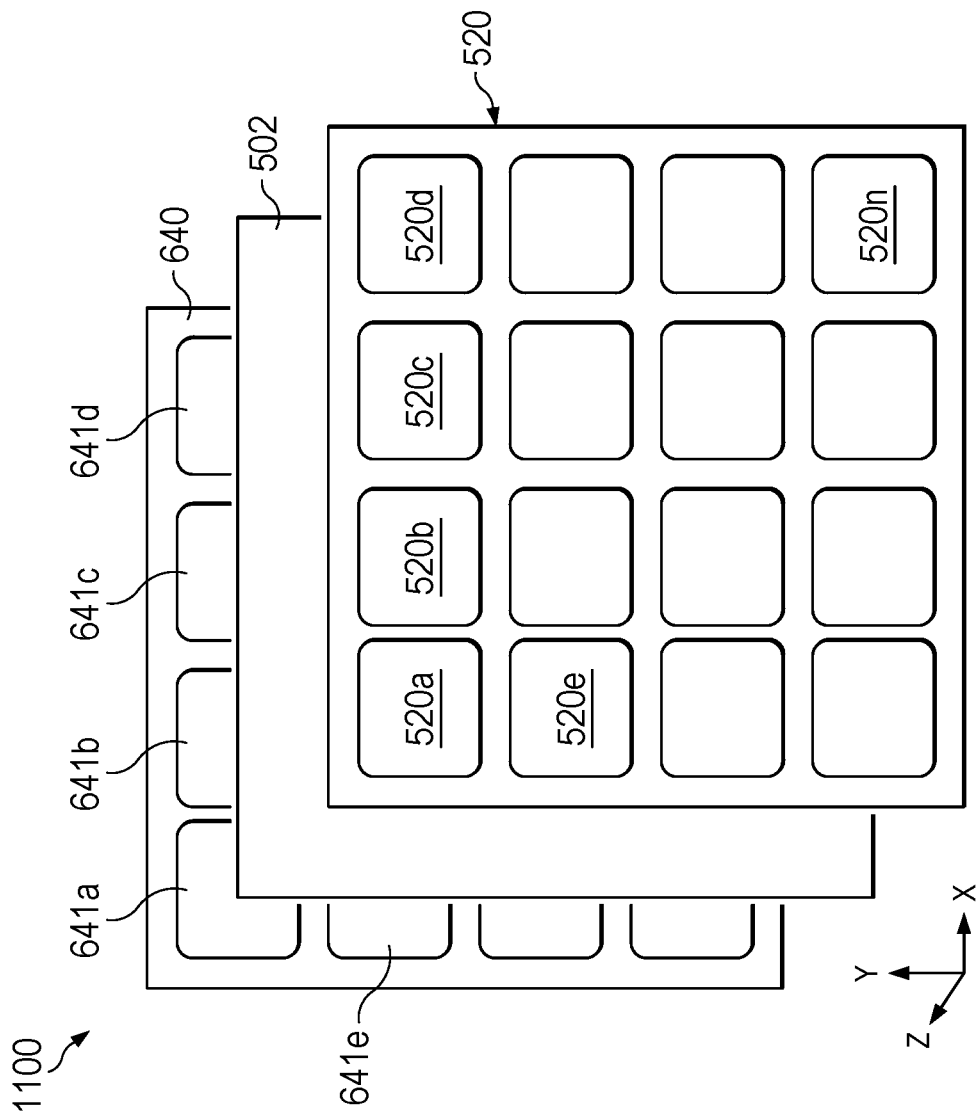
FIG. 11 shows an example beam steering system including a multi-segment LC beam steering device arranged between an upstream lens array and a downstream lens array, including two-dimensional arrays of LC beam steering segments, upstream lens elements, and downstream lens elements, according to one embodiment.

FIG. 11 shows an example beam steering system 1100 including a multi-segment LC beam steering device 502 arranged between an upstream lens array 520 and a downstream lens array 640. In this example, the multi-segment LC beam steering device 502 comprises a two-dimensional array of LC beam steering segments 503a-503n, upstream lens array 520 comprises a two-dimensional array of upstream lens elements 521a-521n, and downstream lens array 640 comprises a two-dimensional array of downstream lens elements 641a-642n. Upstream lens elements 521a-521n and downstream lens elements 641a-642n may comprise circular, square, hexagonal, or other types of lenses configured to influence respective light beams in multiple axes (e.g., in the x-axis direction and y-axis direction).

Figure 12:
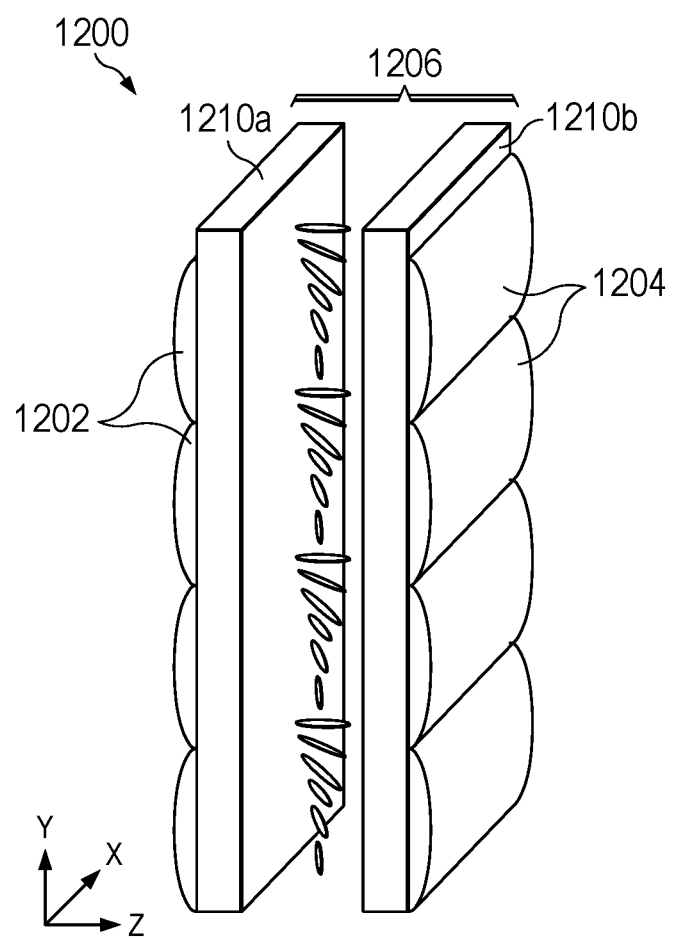
FIG. 12 shows a three-dimensional side view of an example beam steering system including an upstream lens array and a downstream lens array formed integrally with upstream and downstream substrates of a multi-segment LC beam steering device, according to one embodiment.

FIG. 12 shows a three-dimensional side view of an example embodiment of a beam steering system 1200 including an upstream lens array 1202 and a downstream lens array 1204 formed integrally with a multi-segment LC beam steering device 1206. In particular, the upstream lens array 1202 is formed integrally with an upstream substrate 1210a of the multi-segment LC beam steering device 1206, and the downstream lens array 1204 is formed integrally with a downstream substrate 1210b of the multi-segment LC beam steering device 1206.

The invention claimed is:

1. A beam steering system, comprising:
a liquid crystal (LC) beam steering device including:
LC molecules arranged between a pair of substrates; and
at least one electrode;
an upstream lens arranged upstream of the LC beam steering device, the upstream lens reducing a beam width of a light beam to provide a reduced-diameter light beam incident at the LC beam steering device; and
control electronics configured to dynamically control the at least one electrode of the LC beam steering device to influence the LC molecules to affect a directional steering of the reduced-diameter beam and thereby output a directionally steered beam;
wherein the upstream lens has a focal plane; and
wherein the LC beam steering device is arranged upstream of focal plane of the upstream lens.

2. The beam steering system of claim 1, wherein a beam diameter of the reduced-diameter beam incident at the LC beam steering device is smaller than a clear aperture of the LC beam steering device.

3. The beam steering system of claim 1, wherein the control electronics are configured to dynamically control the at least one electrode of the LC beam steering device to control a steering angle of the directionally steered beam output by the LC beam steering device.

4. The beam steering system of claim 1, further comprising a downstream lens arranged downstream of the upstream lens.

5. The beam steering system of claim 4, wherein the downstream lens is arranged downstream of the LC beam steering device.

6. The beam steering system of claim 5, wherein a focal distance of the upstream lens is greater than a focal distance of the downstream lens.

7. The beam steering system of claim 5, wherein the downstream lens reduces a beam width of the directionally steered beam output by the LC beam steering device.

8. The beam steering system of claim 4, wherein the downstream lens is arranged upstream of the LC beam steering device.

9. The beam steering system of claim 1, wherein:
the LC beam steering device includes an array of multiple LC beam steering segments, each LC beam steering segment including LC molecules and at least one associated electrode; and
the upstream lens comprises a lens array including multiple lens elements, each lens element reducing a beam width of a respective light beam to provide a respective reduced-diameter light beam incident at a corresponding LC beam steering segment.

10. A beam steering system, comprising:
a dynamically controllable multi-segment liquid crystal (LC) beam steering device including an array of multiple LC beam steering segments, wherein each LC beam steering segment includes a respective clear aperture; and
an upstream lens array arranged upstream of the multi-segment LC beam steering device, the upstream lens array including multiple upstream lens elements corresponding with the multiple LC beam steering segments;
wherein each upstream lens element reduces a beam width of a respective light beam to provide a respective reduced-diameter light beam incident at a corresponding LC beam steering segment in the multi-segment LC beam steering device, wherein a beam diameter of the respective reduced-diameter beam incident at each LC beam steering segment is smaller than the respective clear aperture of that LC beam steering segment; and
control electronics configured to control each respective LC beam steering segment to directionally steer the respective reduced-diameter beam incident at the respective LC beam steering segment to output a respective directionally steered beam.

11. The beam steering system of claim 10, wherein each respective LC beam steering segment includes:
LC molecules arranged between a pair of substrates; and
at least one electrode controllable by the control electronics to generate an asymmetric reorientation of the LC molecules that influences a steering angle of the directionally steered beam output by the respective LC beam steering segment.

12. The beam steering system of claim 10, wherein:
the upstream lens array has a focal plane; and
the multi-segment LC beam steering device is arranged upstream of focal plane of the upstream lens array.

13. The beam steering system of claim 10, further comprising a downstream lens array arranged downstream of the upstream lens array, the downstream lens array including multiple downstream lens elements, each respective downstream lens element corresponding with a respective LC beam steering segment in the array of LC beam steering segments.

14. The beam steering system of claim 13, wherein the downstream lens array is arranged downstream of the multi-segment LC beam steering device.

15. The beam steering system of claim 14, wherein a focal distance of the upstream lens array is greater than a focal distance of the downstream lens array.

16. The beam steering system of claim 13, wherein the downstream lens array is arranged upstream of the multi-segment LC beam steering device.

17. The beam steering system of claim 10, wherein the multiple upstream lens elements comprise spherical lenses.

18. The beam steering system of claim 10, wherein:
the multi-segment LC beam steering device includes a two-dimensional array of LC beam steering segments; and
the upstream lens array comprises a two-dimensional array of upstream lens elements.

19. A beam steering system, comprising:
a liquid crystal (LC) beam steering device including:
LC molecules arranged between a pair of substrates; and
at least one electrode;
an upstream lens arranged upstream of the LC beam steering device, the upstream lens reducing a beam width of a light beam to provide a reduced-diameter light beam incident at the LC beam steering device; and
a downstream lens arranged downstream of the LC beam steering device, wherein a focal distance of the upstream lens is greater than a focal distance of the downstream lens; and
control electronics configured to dynamically control the at least one electrode of the LC beam steering device to influence the LC molecules to affect a directional steering of the reduced-diameter beam and thereby output a directionally steered beam.

20. The beam steering system of claim 19, wherein:
the upstream lens has a focal plane; and
the LC beam steering device is arranged upstream of focal plane of the upstream lens.

* * * * *